Aug. 26, 1924.
W. C. DAYTON
1,506,164
PROCESS OF AND APPARATUS FOR MAKING GAS
Filed Aug. 9, 1920 14 Sheets-Sheet 1
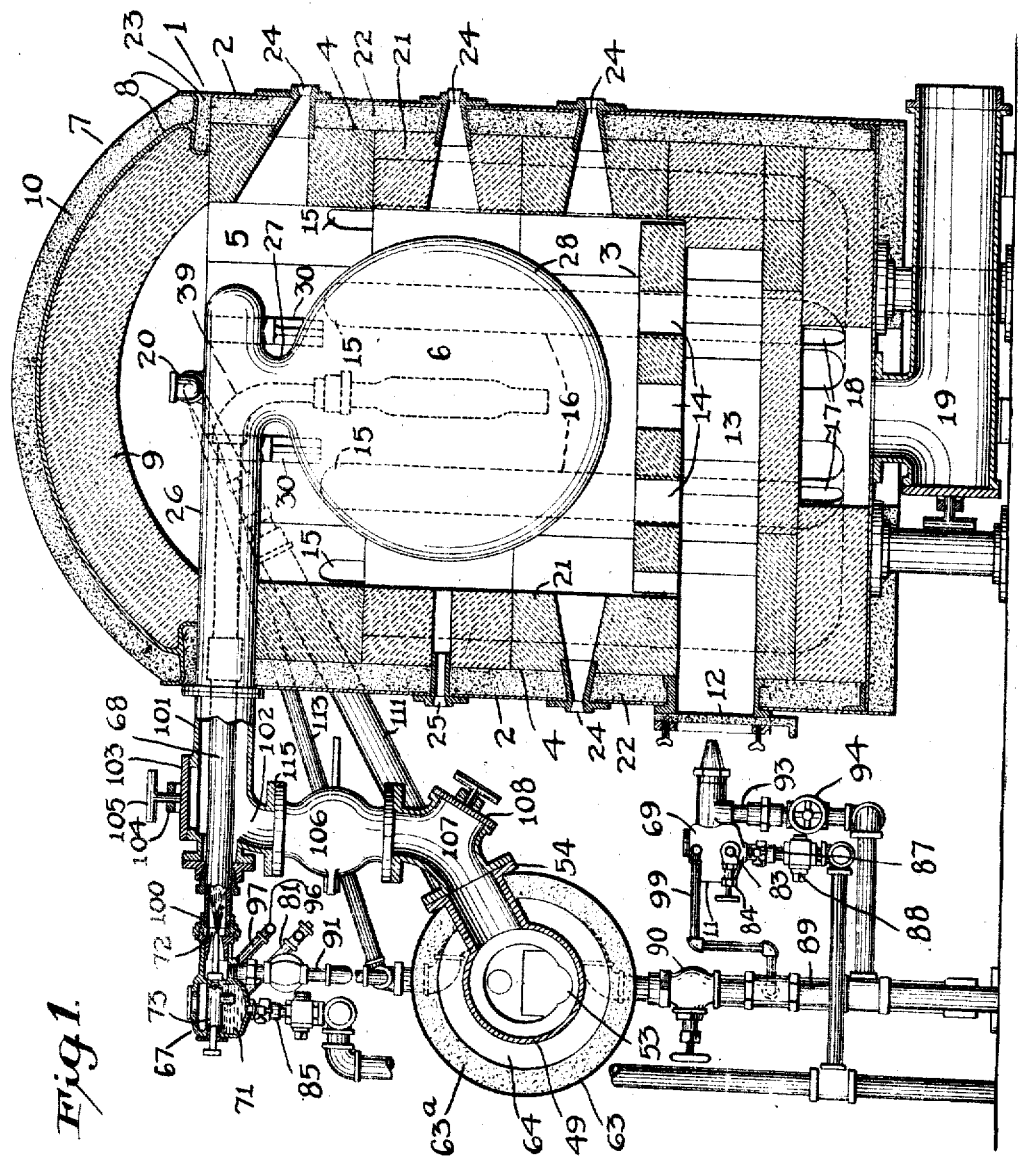
INVENTOR
Walter C. Dayton
BY
Edwin A. Packard
ATTORNEY

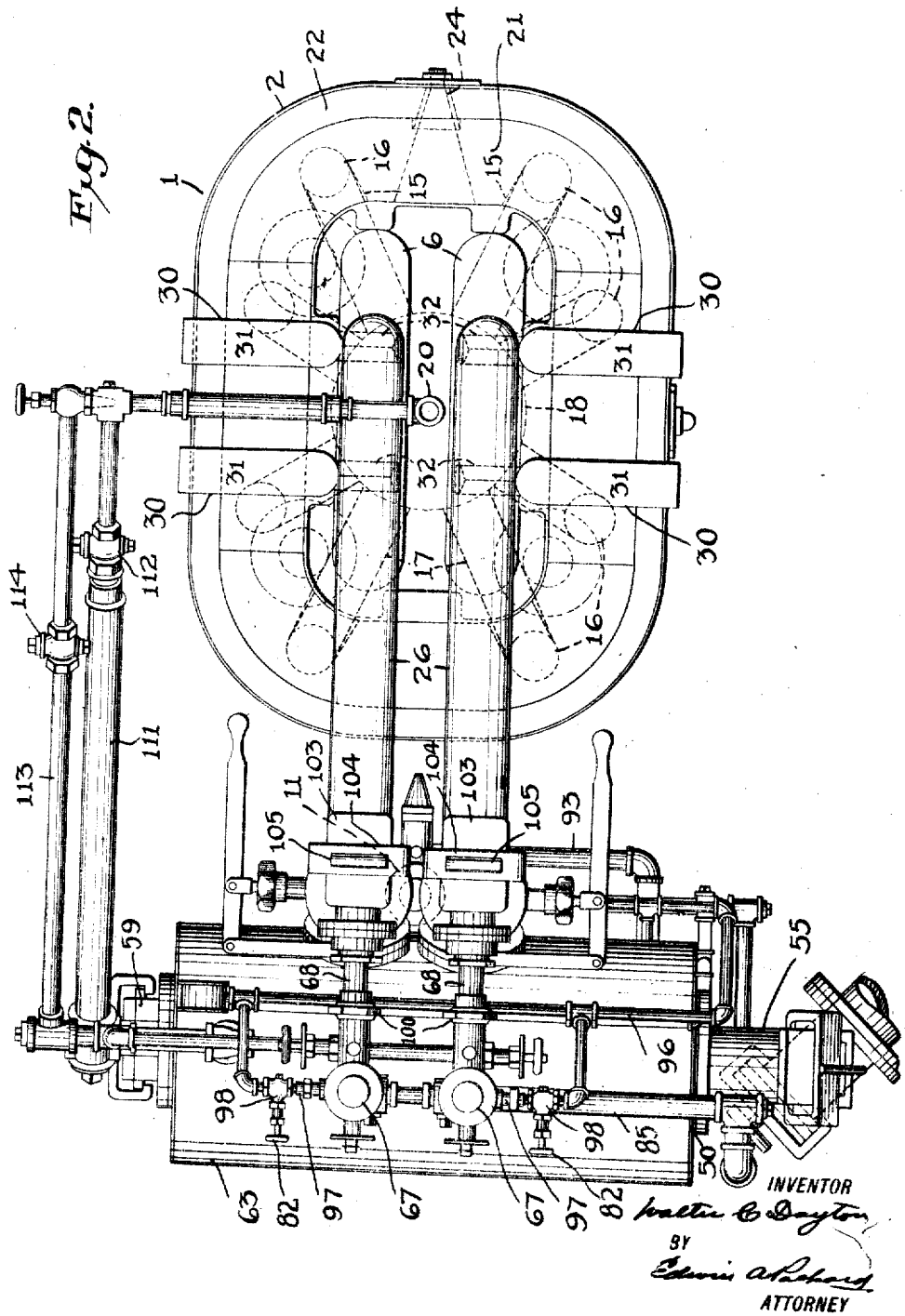

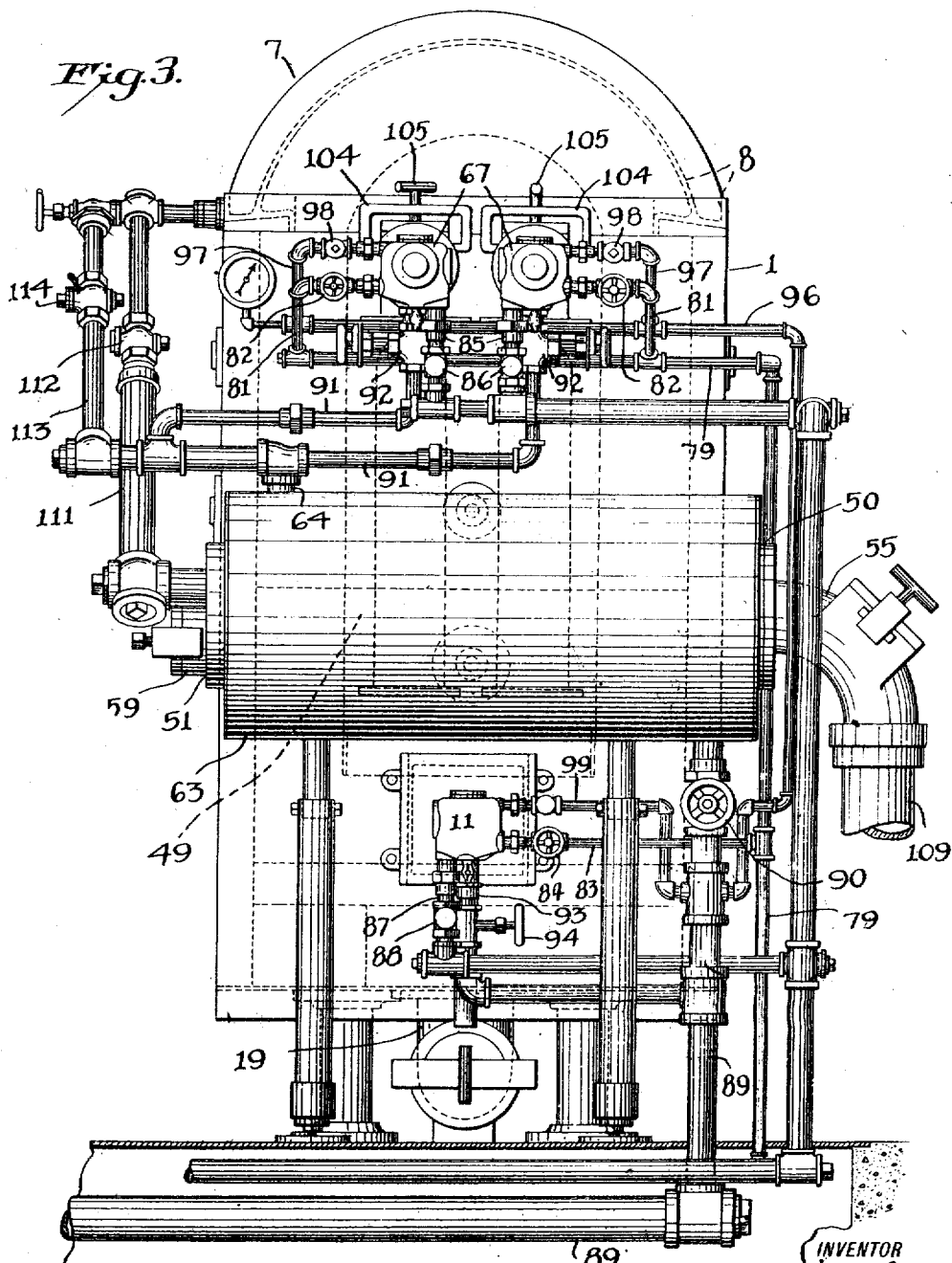

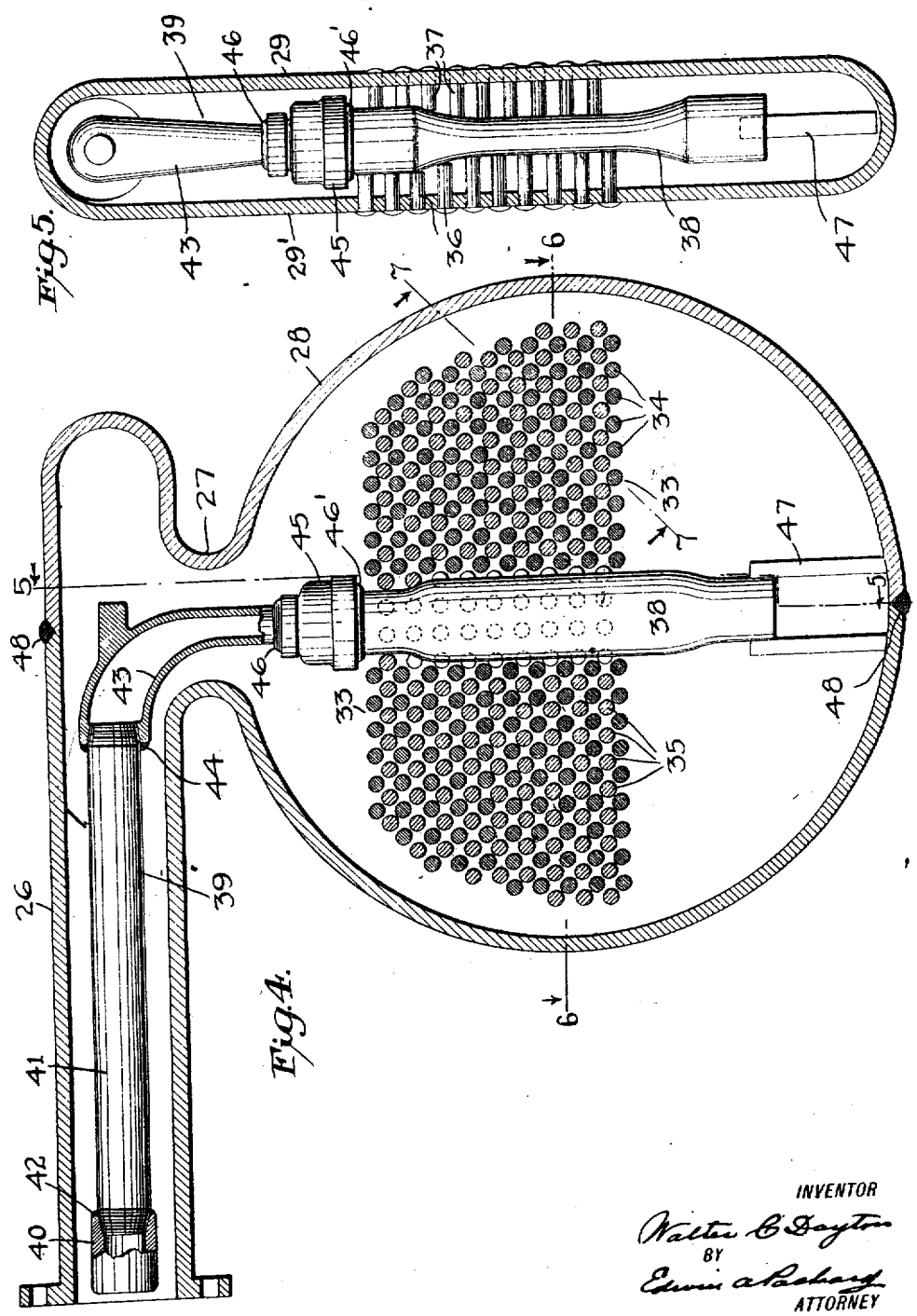

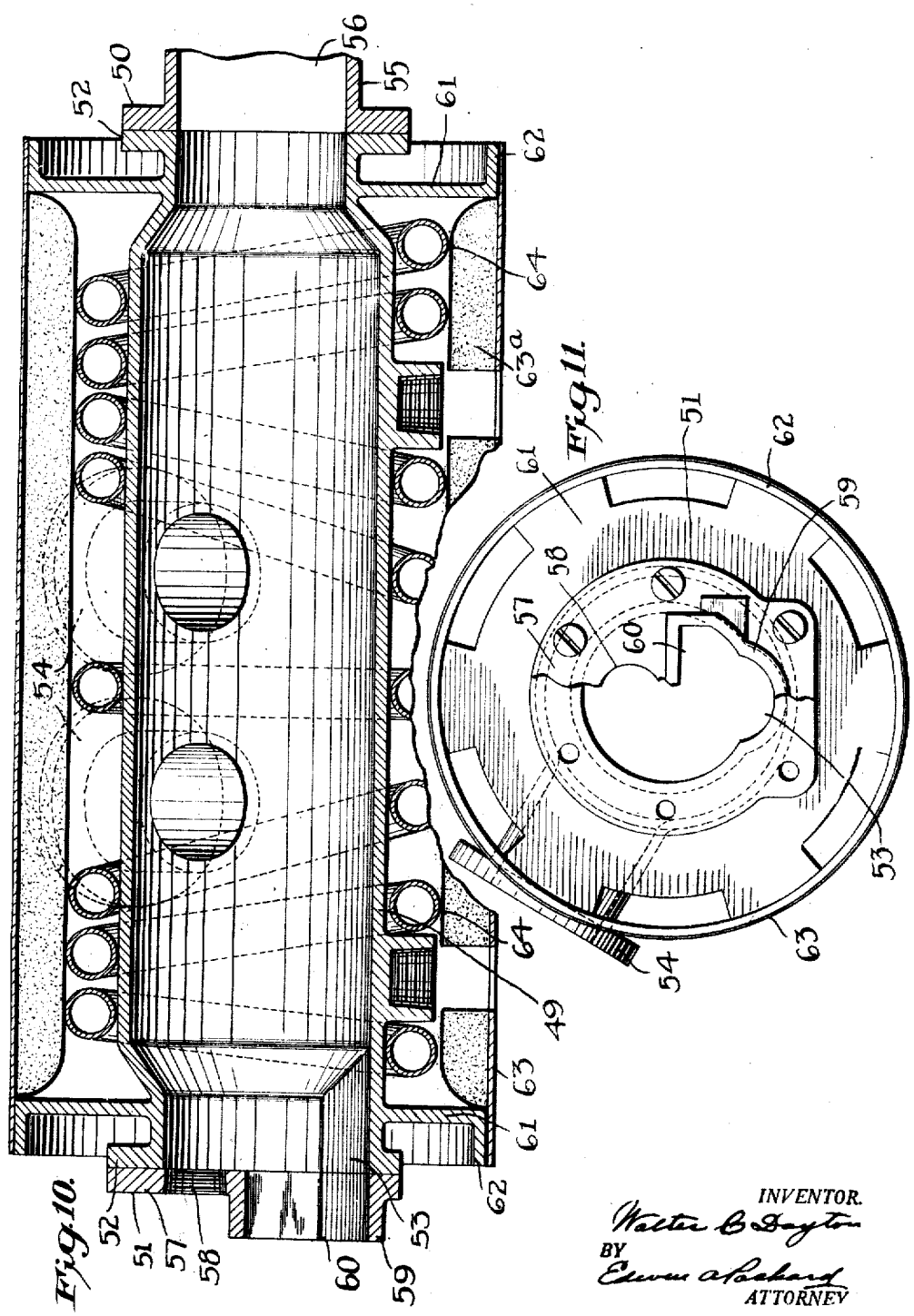

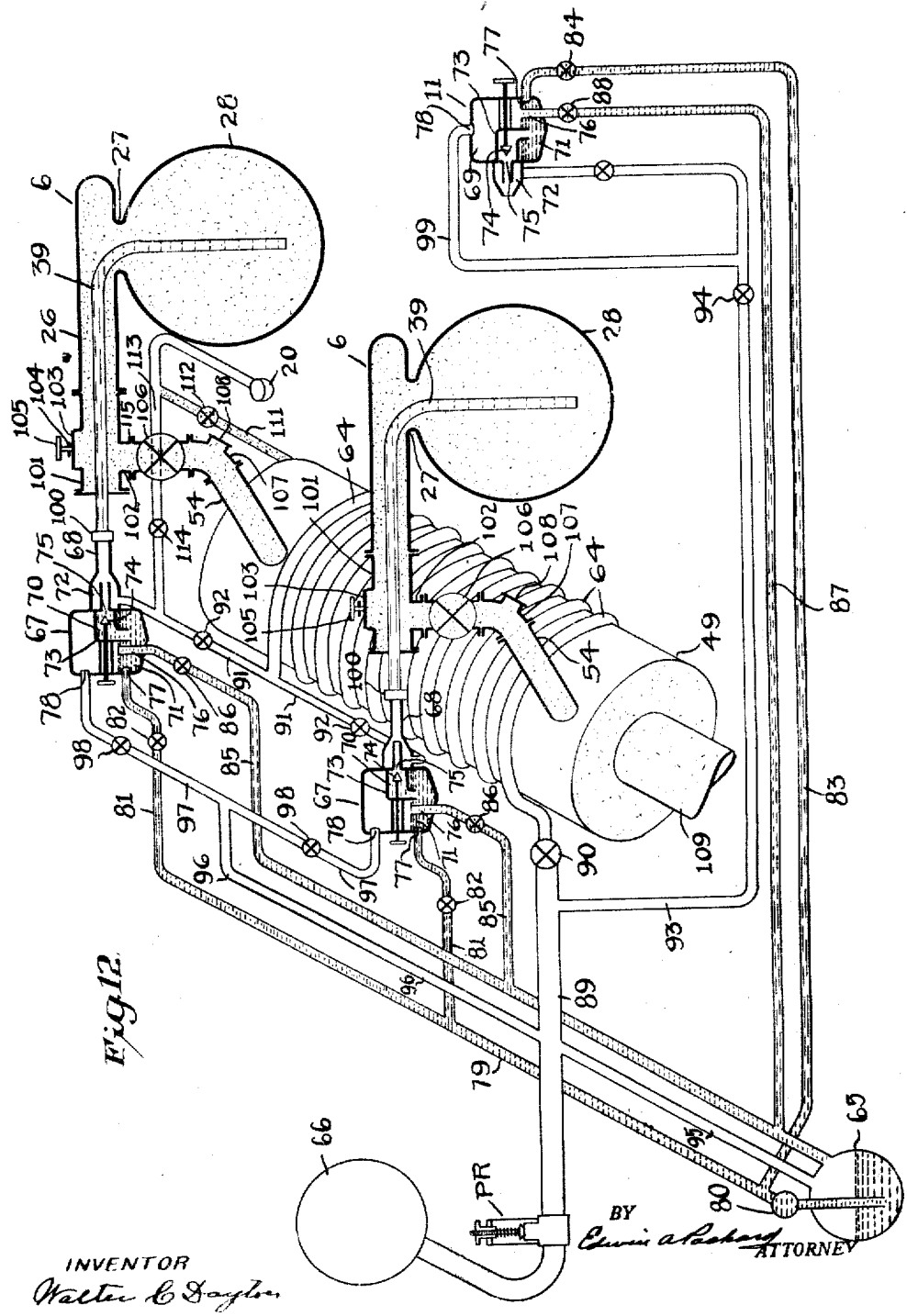

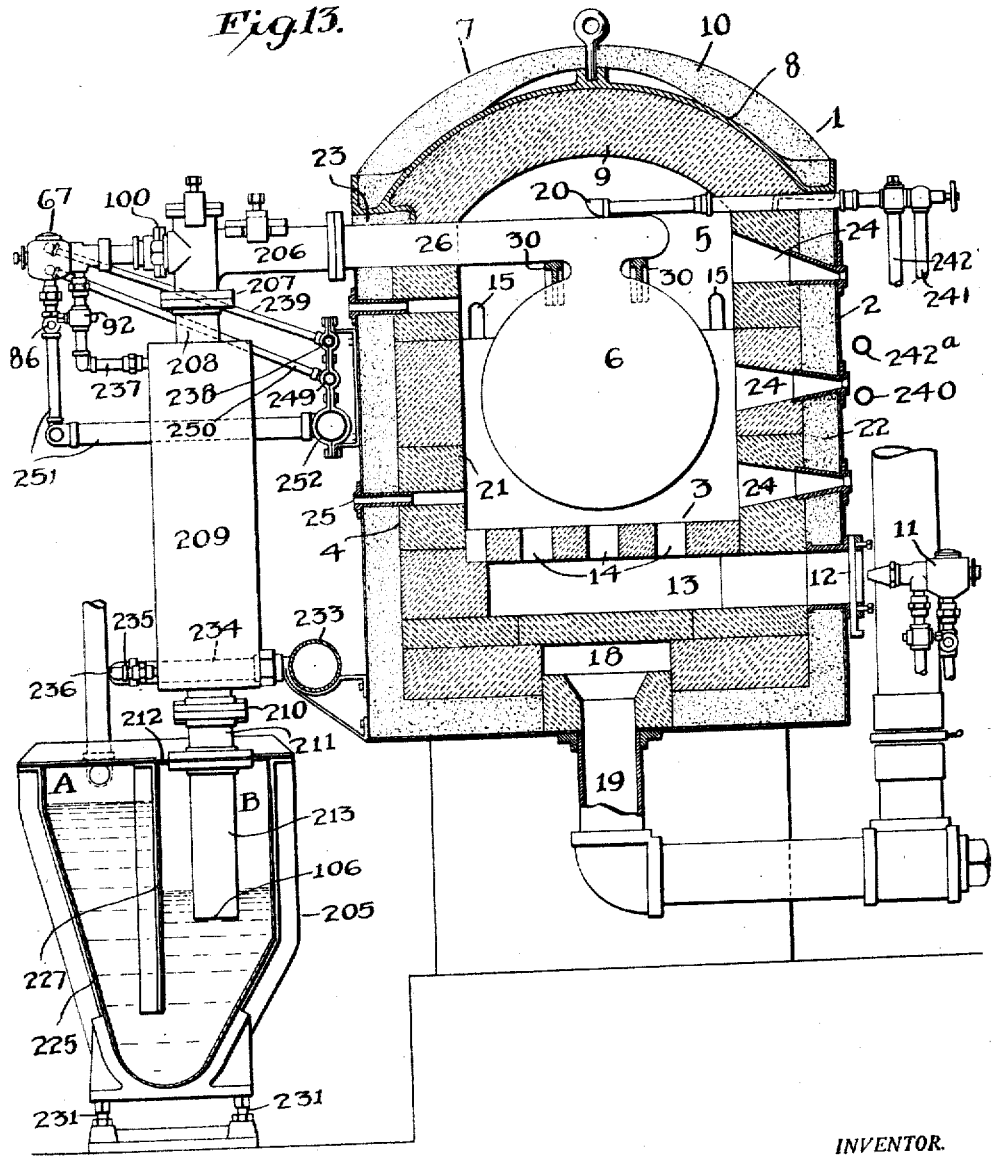

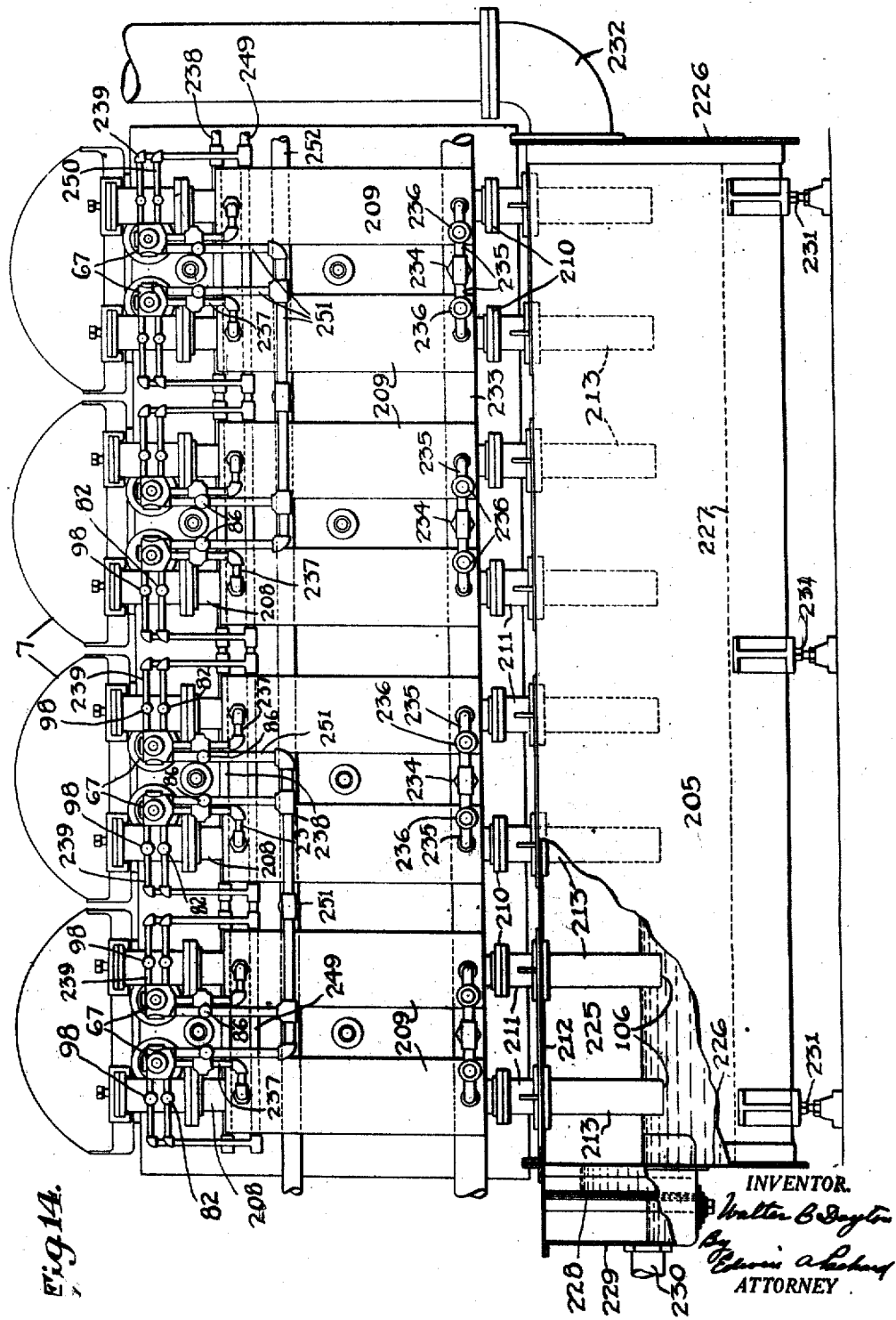

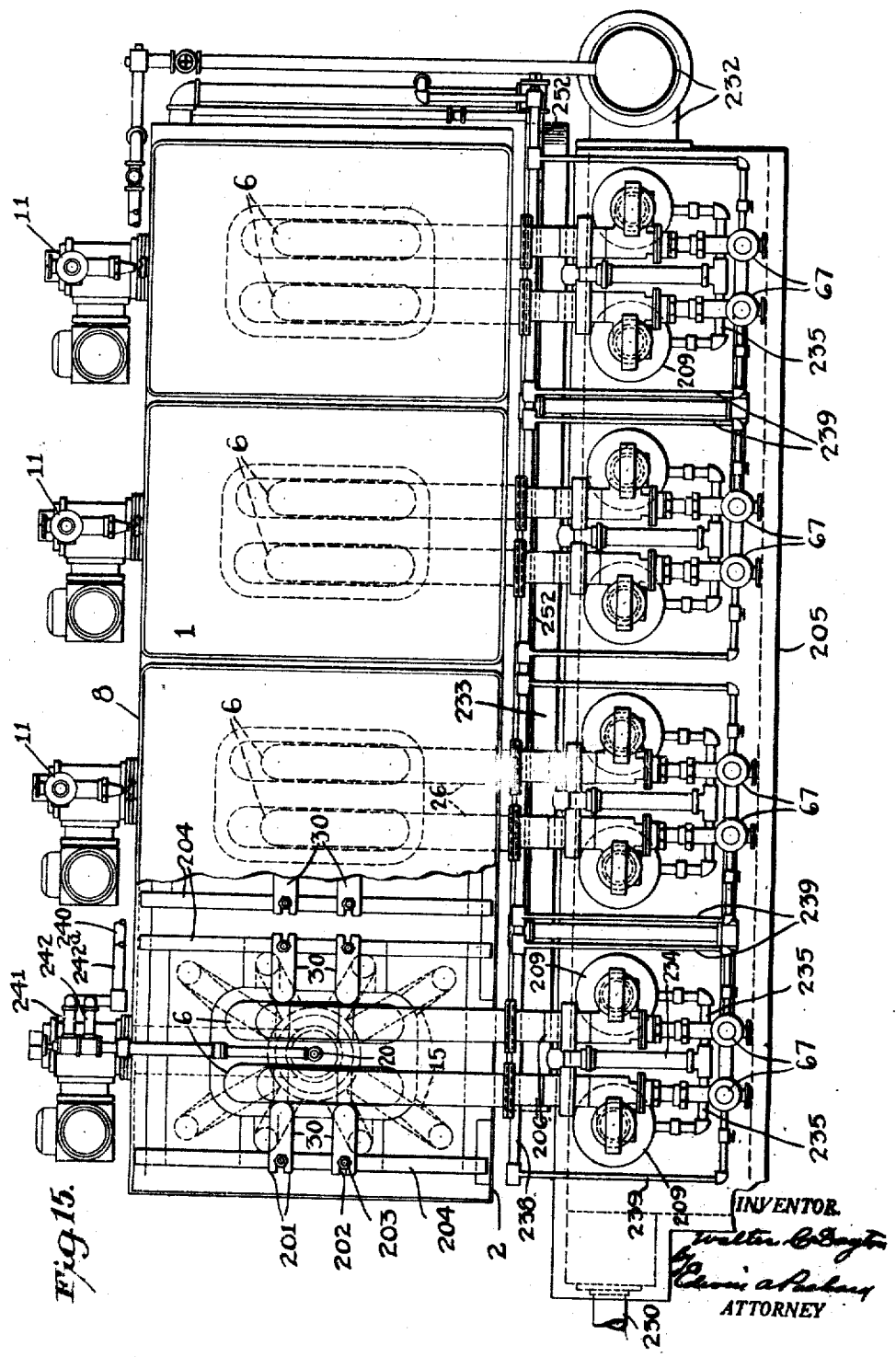

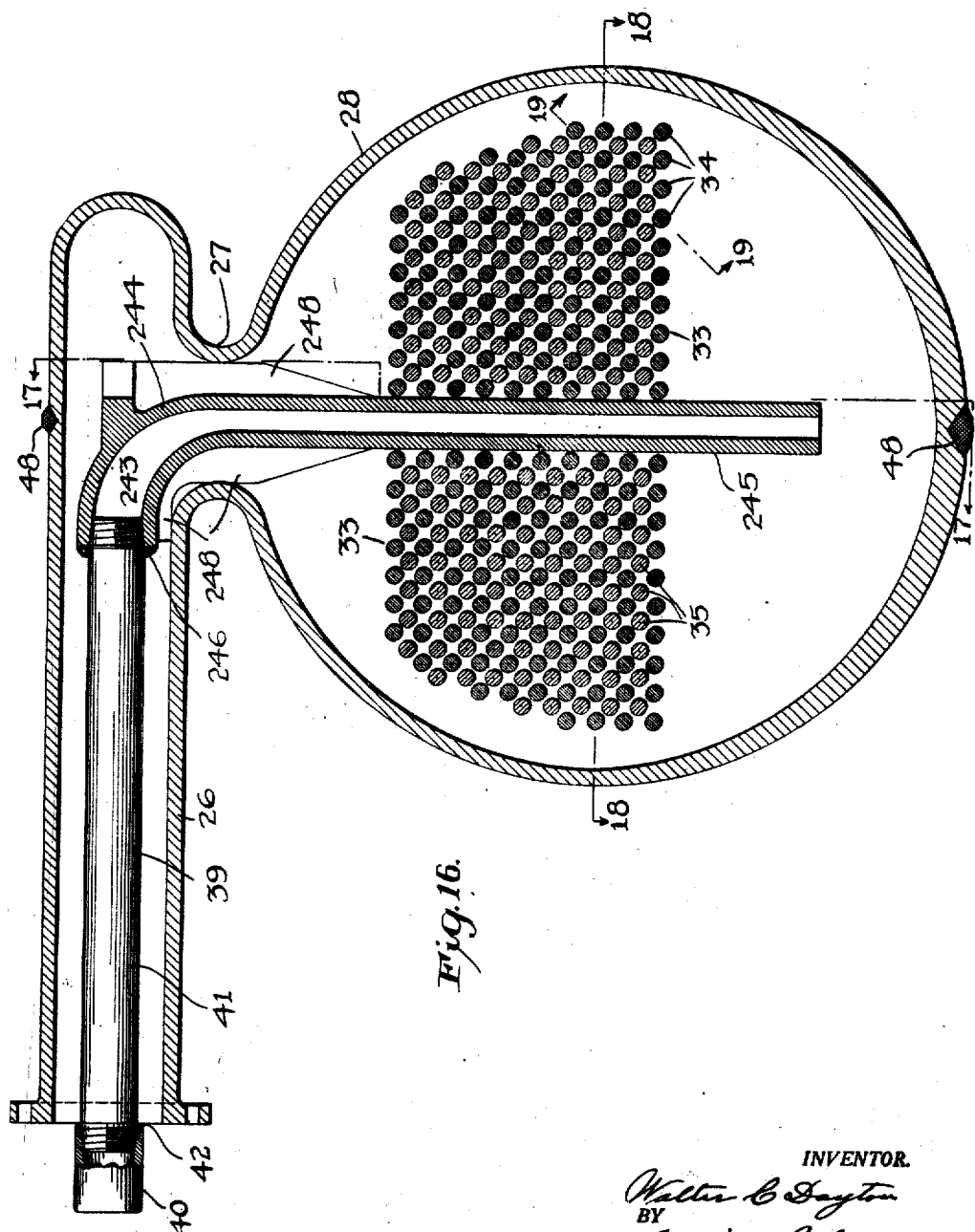

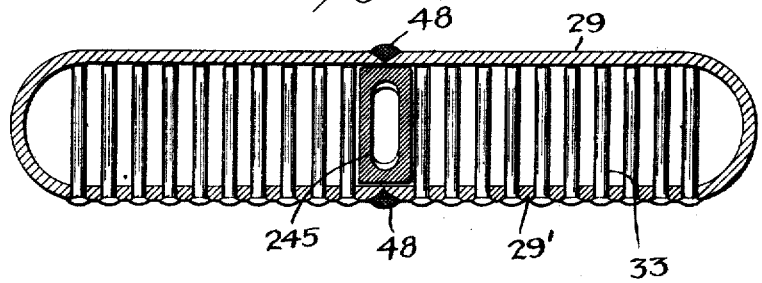
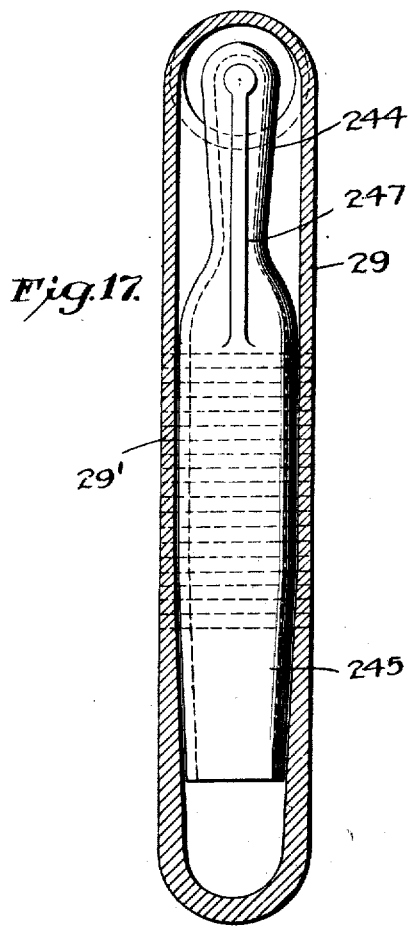
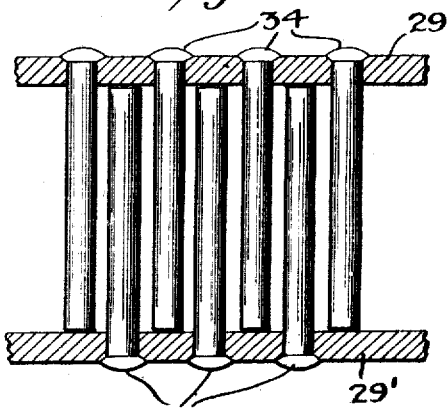

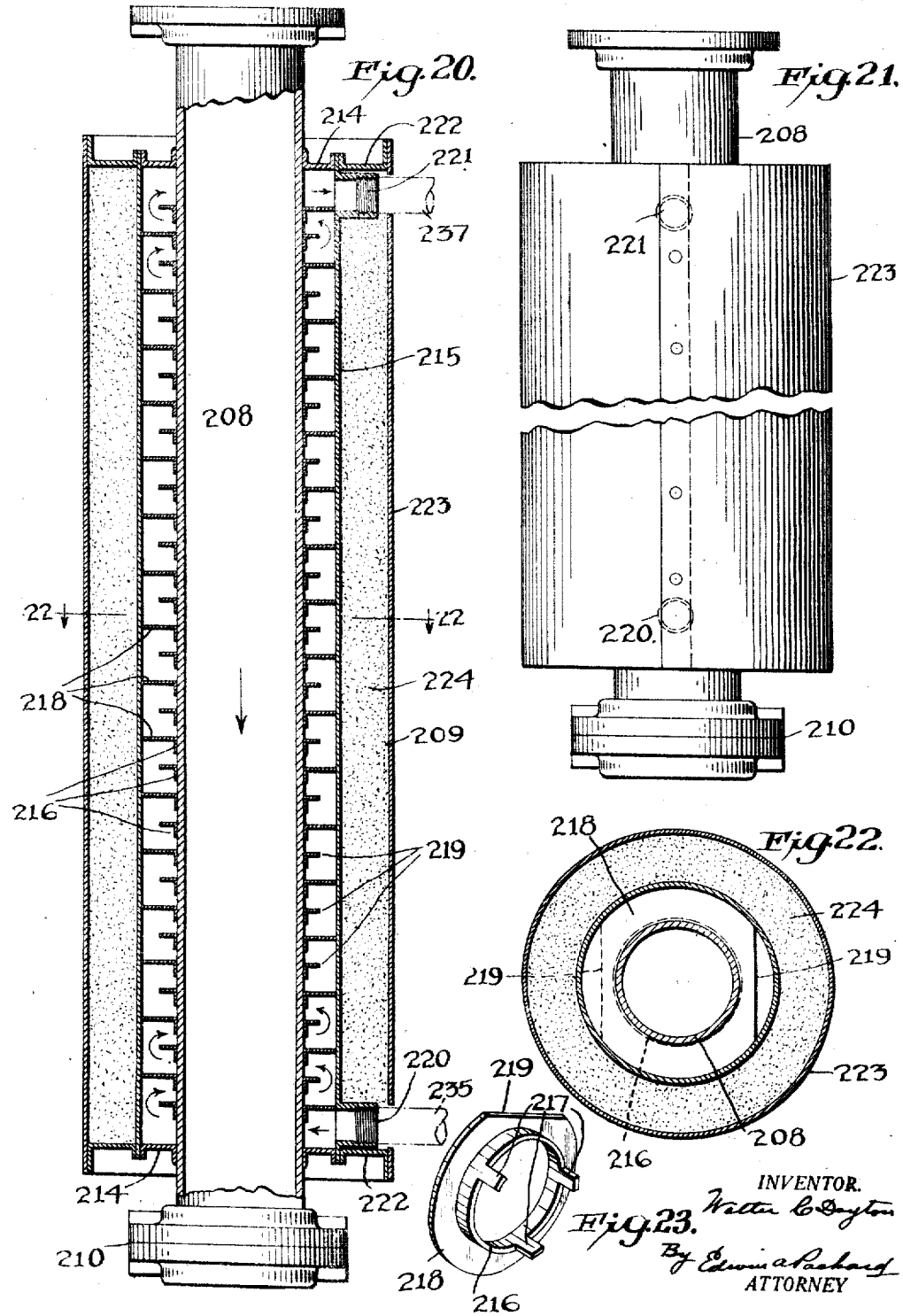

Aug. 26, 1924.
W. C. DAYTON
1,506,164
PROCESS OF AND APPARATUS FOR MAKING GAS
Filed Aug. 9, 1920   14 Sheets-Sheet 14
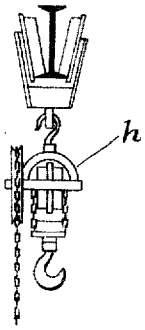
*Fig 24.*
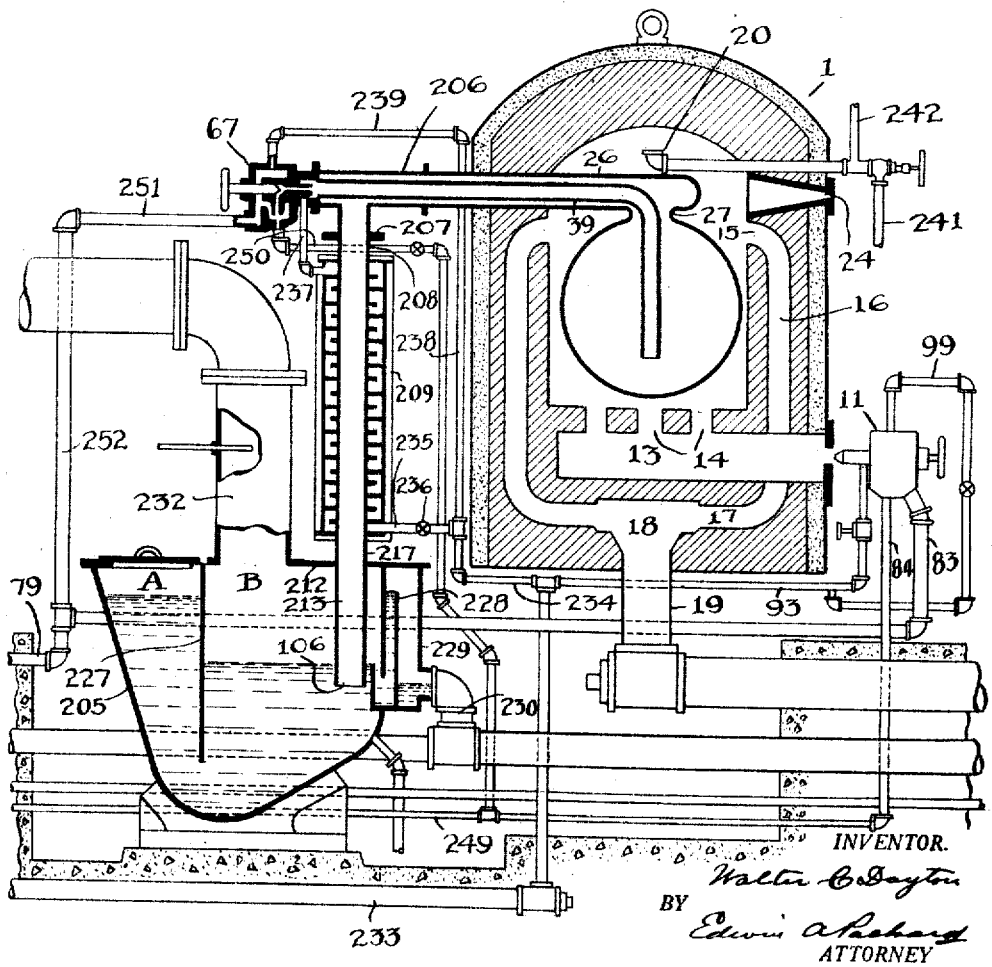
INVENTOR.
Walter C. Dayton
BY Edwin A. Packard
ATTORNEY Patented Aug. 26, 1924.

1,506,164

UNITED STATES PATENT OFFICE.

WALTER C. DAYTON, OF RUTHERFORD, NEW JERSEY, ASSIGNOR TO GENERAL OIL GAS CORPORATION, OF BRISTOL, VIRGINIA, A CORPORATION OF VIRGINIA.

PROCESS OF AND APPARATUS FOR MAKING GAS.

Application filed August 9, 1920. Serial No. 402,170.

*To all whom it may concern:*

Be it known that I, WALTER C. DAYTON, a citizen of the United States, and a resident of Rutherford, in the county of Bergen and State of New Jersey, have made certain new and useful Improvements in Processes of and Apparatus for Making Gas, of which the following is a specification.

The invention relates to the manufacture of a fixed gas of predetermined calorific value and chemical constituency by a method and apparatus which involves the continuous, intimate and uniform mixing of combustible such as liquid hydrocarbons, to wit, oil, with a combustion-supporting gas, to wit, air, while maintaining an established ratio of combustible and combustion-supporting gas for all volumes of combustible and combustion-supporting gas combined, and by causing the mixture to continuously enter a retort providing a gasifying chamber wherein a partial combustion of the combustible in the mixture takes place, said combustion being incomplete or only partial because the combustion-supporting gas is insufficient in amount to effect or allow a complete combustion.

According to one aspect of the present invention the combustion-supporting gas, to wit, air, is heated and the combustible is delivered into this heated combustion-supporting gas, to wit, the heated air, and preferably thereafter the mixture is subjected to a further heating prior to its introduction into the retort or gasifying chamber where the partial combustion and conversion into the fixed gas takes place.

In the preferred form of realizing the invention the heating of the combustion-supporting gas and the subsequent heating of the mixture prior to entering the gasifying chamber are affected by heat absorbed from the resultant fixed gas as the same flows in counter direction to that in which the incoming combustion-supporting gas and the mixture of hot combustion-supporting gas and combustible flow on the way to the combustion chamber. In other words, by the preferred arrangement the fixed gas gives up heat first to the mixture which is on its way or is about to enter the retort or gasifying chamber and thereafter the fixed gas which has lost some of its heat—the heat that is passed into the mixture—gives up more of its heat to the incoming combustion-supporting gas into which the combustible is delivered to form the mixture of combustible and heated combustion-supporting gas.

According to one arrangement of apparatus for realizing the invention gas is generated in a plurality of retorts—arranged in sets—and the construction is such that any retort of any one set can be removed and replaced by another without arresting or stopping the operation of making gas in any of the other sets.

The invention relates to the features above referred to and also others all of which are clearly set forth and described herein. As illustrating how the invention may be realized reference is made to the accompanying drawings forming a part of this specification and in which drawings, Figure 1 is a vertical view, mostly in section, illustrating an apparatus having a retort located in a chamber provided by a masonry structure, having a lining, and within a metallic casing. In this figure a mixing device is shown in section which mixing device comprises an oil reservoir and a mixing chamber wherein and whereby oil—the combustible—and air—the combustion-supporting gas—are mixed and from which mixing chamber the mixed air and oil pass to the interior of the retort. In this figure there is also shown means whereby the air that is conducted to the mixing chamber is heated by the hot gaseous products on their way in transit from the retort, as on their way to a gas holder. According to the construction shown, however, the hot gases leaving the retort impart heat to the mixture of oil and air leaving the mixing chamber prior to the hot gases giving up their heat to the air that is flowing to the mixing chamber. In this view there is also shown a means whereby the masonry structure and the retort therein are heated prior to the starting of making gas in the retort.

Figure 2 is a plan view of the apparatus shown in Figure 1, and in this view it will be noted there are two retorts constituting a set of retorts, each of which is connected to a header piping shown in Figures 10 and 11.

Figure 3 is a front elevational view of the apparatus shown in Figures 1 and 2.

Figure 4 is a vertical view of a retort 11 such as is used in the apparatus. This view is mostly in section and it may be referred to as a vertical longitudinal sectional view.

Figure 5 is a vertical transverse sectional view of the retort shown in Figure 4 and is a view taken as on the plane indicated by the line 5—5 of Figure 4 looking in the direction of the arrows.

Figure 6:
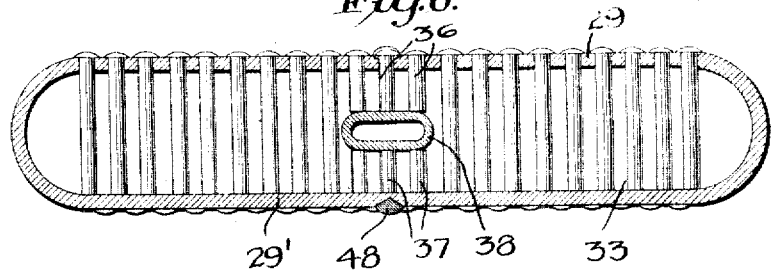

Figure 6 is a horizontal transverse sectional view of the retort and is a view taken as on the plane indicated by the line 6—6 of Figure 4 looking in the direction of the arrows.

Figure 7:
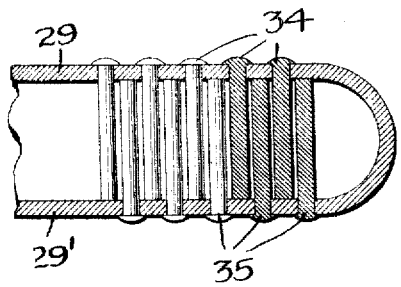

Figure 7 is a sectional horizontal view of a portion of the retort and is a view taken as on the plane indicated by the line 7—7 of Figure 4 looking in the direction of the arrows. In this figure some of the pins have been shown in section while other of the pins have purposely not been shown in section in order that the true structure of the pins and their method of mounting will be more clearly set forth.

Figure 8:
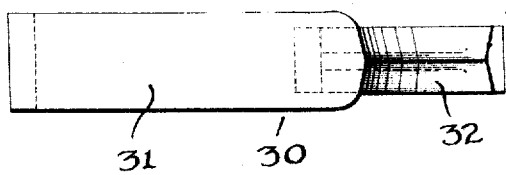
Figure 9:
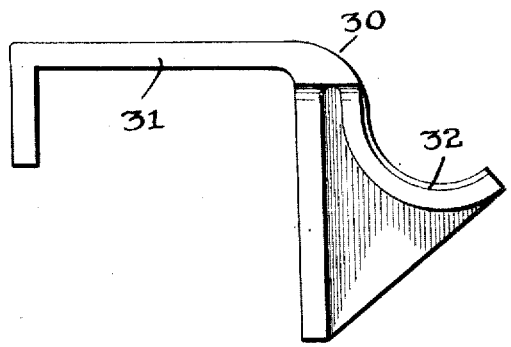

Figures 8 and 9 are respectively plan and side views of a bracket or hook-shaped member employed for supporting the retort in place in the apparatus.

Figure 10 is a view showing in section the header piping which is a member to which each retort of the set of retorts is connected. It also shows in position a cap at each end of the header piping, a casing as carried by the header piping, and some of the piping through which the combustion-supporting gas, to wit, air, passes on its way to the mixing chambers of the mixing devices. The construction shown in this figure constitutes what is referred to as a heat-interchanging device.

Figure 11 is an end view of the header piping shown in Figure 10.

Figure 12 is a diagrammatic view illustrating the connecting of the retorts to the header piping. It shows the association of the several mixing devices and the pipes or conduits leading from the mixing chambers of each mixing device to the interior of the corresponding retort, and also the burner for initially heating the masonry of the apparatus within which the retorts are located and for initially heating the retorts therein—which burner has a mixing device similar to that used in conjunction with each retort. In this view as well as in Figures 1, 2, and 3, there is shown a pilot burner that is employed in some instances to supply external heat to the retorts, as when it is desired to make a richer gas therein than it would be possible to make if external heat were not supplied. This pilot is also used when starting "cold" by burning some of the first gas made to heat up the masonry above the level of the outlet flues leading from the chamber within which the retort is located. This figure also shows an air pump, a tank for the liquid hydrocarbons and a relatively closed piping system between the air pump and the tank on the one hand, and the mixing chambers of the mixing device corresponding to each retort, the mixing chamber of the burner for initially heating the retorts and the pilot burner on the other hand. In this figure there is also shown the arrangement of the piping whereby the hot products or resulting gas within or leaving the retort supplies heat to the mixture of air and hydrocarbons entering the retort and also how the hot products—after they have lost some of their heat—are employed to heat the air supplied to the mixing chamber of each mixing device corresponding to the retort, prior to introducing into said air the hydrocarbons which are to be gasified. There is also a piping arranged so that the heated air can pass to the pilot burner and there unite with gases which are supplied from the gas system, as from the header piping.

Concerning the construction of the apparatus as shown in Figures 1 to 12 inclusive, it will be observed that the heating of the combustion-supporting gas, to wit, the air, prior to its entrance into the mixing device is accomplished by a heat interchanging device which is embodied in or embodies the header piping, such as shown in Figures 10 and 11.

In Figures 13 to 24 inclusive, an apparatus is illustrated which is similar to the apparatus shown in Figures 1 to 12, but in the apparatus shown in Figures 12 to 24 the header piping is actually a hydraulic main and the heat interchanging means for heating the combustion-supporting gas—the air—includes a number of heat interchanging devices, there being such a device for and corresponding to each mixing device; or, in other words, for and corresponding to each retort. Each heat interchanging device is embodied in or embodies a vertically extending piping between the header piping and hydraulic main on the one hand and the corresponding mixing device and retort on the other. In the same figures and particularly in Figures 13, 14, and 15, there is illustrated a gas making apparatus wherein the retorts within which the gas is produced are arranged in sets—two retorts in each set—and wherein the several sets of retorts are all connected to a common hydraulic main or common header piping.

Figure 13 is a vertical view mostly in section. In this figure the hydraulic main or header piping is shown in section. There is also shown the exterior of a heat interchanging device located in or which embodies vertically extending piping. The hot gases produced and flowing from the retort ultimately flow downwardly through this heat interchanging device to the hydraulic main and air enters the lower portion of this heat interchanging device and flows upwardly therethrough on its way to the mixing device by which a proportionate amount of air or combustion supporting gas and combustible are mixed preparatory to the introduction of the mixture into a retort where the fixed gas is formed.

Figure 14 is a front elevation with a portion of the hydraulic main broken away.

Figure 15 is a plan view of the apparatus illustrated in Figures 13 and 14. Figures 14 and 15 show how the retorts are arranged in sets with two retorts in each set and also when taken in conjunction with Figure 13 show how each retort of the several sets of retorts is connected to the common header piping or hydraulic main.

Figure 16 is a vertical view of the retort which may be used in the apparatus of Figures 13 to 15. This is a view mostly in section and may be referred to as a vertical longitudinal sectional view.

Figure 17 is a vertical transverse sectional view of the retort shown in Figure 16 and is a view taken as on the plane indicated by the line 17—17 of Figure 16 looking in the direction of the arrows.

Figure 18 is a horizontal transverse sectional view of the retort shown in Figure 16 and is a view taken as on the plane indicated by the line 18—18 of said figure looking in the direction of the arrows.

Figure 19 is a partial sectional view of the retort shown in Figure 16 and is a view taken as on the plane indicated by the line 19—19 of said figure looking in the direction of the arrows.

Figures 16 to 19 inclusive illustrate as previously indicated a retort such as is used in the apparatus of Figures 13 to 15 inclusive. It may be used in the apparatus of Figures 1 to 3. The retort illustrated in Figures 16 to 19 is the same in principle as but differs somewhat in detail from the retort of Figures 4 to 6. These retorts can be used interchangeably.

Figure 20 is a vertical view—mostly a transverse sectional view—showing the construction of the heat interchanging device that is embodied in or that embodies the piping between the retort and the hydraulic main of the construction shown in Figures 13 to 15 inclusive.

Figure 21 is an exterior view partially broken away of the heat interchanging device of Figure 20.

Figure 22 is a horizontal sectional view taken as on the plane indicated by the line 22—22 of Figure 20 looking in the direction of the arrows.

Figure 23 is a perspective view of one of the deflecting members or baffle members included in or relied upon in the heating device to cause the air to take a sinuous or circuitous path in passing through the heat interchanging device.

Figure 24 is what may be considered a diagrammatic vertical sectional view of the apparatus illustrated in Figures 13 to 15 inclusive. This diagrammatic view illustrates the manner in which the several parts of the apparatus are connected and therein some of the parts have been somewhat distorted,—the hydraulic main for example has been somewhat distorted in order that the principle of its operation may be illustrated in a single figure in conjunction with the rest of the apparatus.

Reference will now be made to the drawings in detail.

*Structure of the masonry within which the gas generating retorts are located.*

The gas generating portion of the apparatus, of Figures 1 and 3 and also of the apparatus of Figures 13 to 15 comprises a masonry structure 1 included within a metallic casing 2, and this masonry st— provides a floor portion 3 and side walls 4 of a chamber 5 having therein a set of retorts which includes the retorts 6, 6. The roof of this chamber is designated by 7 and includes a cast holding member 8 that serves to hold and maintain in place a lining 9 of highly refractory material. The holding member 8 is covered by a layer of heat insulating material, as 10. The roof member is made so that it can be lifted from place as by a hoist "h" (see Figure 24) whereby access to the interior of the chamber 5 and to the retorts 6 is readily accomplished. A burner for initially heating the interior of the chamber 5 and the retorts 6 therein is designated as 11. This burner is supplied by air and liquid hydrocarbon, to wit, the oil, in a manner which more fully hereinafter appears. When it is desired to start the apparatus a cover member or closure plate 12 is removed from the position shown in Figure 1 and the burner is lighted whereby the burning products enter an opening 13 pass upwardly through openings 14 into the chamber 5 and around the retorts 6; the products of combustion leave the chamber 5 through openings 15 and passageways 16 from which they flow through openings 17, space 18, and piping 19, to the stack. When the masonry structure and the retorts have become sufficiently heated the apparatus is started, the initial burner 11 is shut off, the cover member or enclosure plate 12 is replaced to the position shown in Figure 1 and a damper in the damper-controlled piping 19 leading to the stack is closed. If a pilot burner, designated as 20, is not lighted. Concerning the pilot burner it will here be noted that it may be used continuously where a richer gas is desired than is possible without it. It is also used when starting "cold" by burning some of the gas from a previous run or by burning some of the first gas made to heat up the masonry located above the level of the outlet openings 15. If, however, the pilot burner 20 is lighted then the damper in the piping leading to the stack would be only partially closed in order to permit an escape of the waste gases or products of combustion from the interior of the chamber 5. The side walls 4 of the masonry include a portion 21 of high refractory material and a portion 22 of heat insulating material. When the roof portion 7 is in place the joint between the side walls and roof is sealed, as at 23, by any suitable material, such as fire clay or heat insulating material in plastic form. The casing 2 is provided with peek holes 24 arranged so that the interior conditions in the chamber 5 may be readily observed at any time. These peek holes, however, are normally closed. Openings may also be provided for the insertion of thermo-couples for ascertaining the accurate temperature conditions within the chamber and a hole for this purpose is designated as 25. Of course, this hole is normally closed by the thermo-couple connection against the entrance of cold air to the interior of the chamber.

*Retort structure and method of supporting same.*

A retort which may be employed in the apparatus of Figures 1 to 3 is shown in Figures 4 to 7 inclusive. This same retort may be used in the apparatus of Figures 13 to 15 for as far as this function of the retort is involved both forms of the apparatus are substantially the same. This retort comprises a longitudinally extending tubular portion 26 that may be referred to as a member, even though it constitutes only a part of a retort as a whole. This tubular portion or member 26 extends horizontally and provides an exit pipe or conduit leading from the interior of the retort. The retort also has a throat portion or member 27 and a bulbous body portion or member 28 having relatively flat sides or heads 29 and 29'. The member 28 is sometimes referred to as a depending bulbous body portion or member and is in communication with and carried from the longitudinally extending tubular portion or member 26 by means of the throat portion or member 27. Each retort is supported in place by brackets or hook-shaped members 30 shown in Figures 8 and 9. An extension 31 of each of these members rests upon the refractory walls and the hook 32 of each member engages the under side of each tubular portion of member 26. It will here be observed that the longitudinally extending portion or member 26 extends in opposite directions past the throat member 27, to wit, forward of and behind the throat member; one of the hook-shaped members 30 being in effect ahead and the other behind the throat portion. This longitudinally extending portion or member 26 may properly be referred to as a bridge member since it bridges the space between these two hook-shaped members or supports 30. Said portion or member 26 may also be properly referred to as a bridge member providing an exit conduit since it has an exit passageway leading from the interior of the retort.

By means of this construction it will be readily appreciated that any one retort can be removed from its place in the masonry without disturbing the other retort when the piping leading to and from the retort to be removed is disconnected. Of course, during the removal of any particular retort the roof 7 is removed from the structure. The retort is provided with a number of baffle members, referred to collectively as 33, located so as to cause the products within the retort to take a sinuous path in passing through the retort. By this arrangement all of the gaseous products within and passing through the retorts are subjected to the influence of the heated baffle members. In the generating of fixed gas, from a combustible such as liquid hydrocarbons, by partial combustion within a metallic retort, the metal in the retort swells. Experience has shown that baffle members which connect opposite sides of the retort create or maintain awkward and objectionable strains on the metal of the retort structure. It is therefore advisable to construct the retort with baffle members arranged in such a manner that they do not connect the opposite sides of the retort and so that they avoid short circuiting, so to speak, of the gases through the retort. In the retort shown the baffle members are provided by pins arranged in sets or rows and so that the pins in one set or row are all carried by one head and extend toward and adjacent to the other head, but so that they are not supported in any manner by the last mentioned head. The pins carried by the head 29, for example, are designated as 34 and the pins carried by the head 29' are designated by 35. All of the pins 34, or 35 as the case may be, extend from the head carrying them toward and adjacent to the opposite head, with the exception of the pins 36 and 37 of Figure 6 which are carried by these heads but extend only adjacent to a depending portion or member 38 of an angular tubular member or pipe 39, as is readily seen from an inspection of the drawings. The description of the retorts thus far applies not only to retort of Figures 4 to 7 but also to the retort of Figures 16 to 19.

The angular tubular member or pipe 39 of each form of retort provides a pipe or conduit whereby the mixture of liquid combustibles and combustion-supporting gas enters the retort. In the retort of Figures 4 to 7 said member 39 comprises a fitting 40 into which pipe 41 is threaded; the fitting 40 and pipe 41 are welded together, as at 42, thus in effect producing a unitary structure at this point. The pipe 41 is threaded into an angle member or elbow 43 of suitable metal, for example cast-steel, and is welded to the latter at 44. The depending member 38 is in cross-section in the form of a flattened tube, as shown in Figure 6, and is connected to the elbow 43 in any suitable manner, as by means of a fitting 45, there being welds, as at 46 and 46'. In the retort of Figures 16 to 19 the angular tubular member 39 also comprises a fitting 40 into which pipe 41 is threaded and they are welded together at 42. The rest of the member 39 instead of being an assembled and built-up construction, so to speak, comprises only a single casting, as 243, of suitable material, which provides the angle or bend 244 and also the depending portion 245, which in cross-section is in the form of a flattened tube, as shown in Figure 18. The pipe 41 is threaded into the upper end of the casing 243 and is welded to the latter, as indicated at 246. There is a restriction at 247 in the passageway of this depending portion or member 245. This restriction is below the curve of the angle or bend 244 but above the zone of the baffles 33 of baffle pins. A similar restriction which is similarly located is found in the angular tubular member 39 of the retort of Figure 4. The casting 243 is made so that the depending portion 245 practically fits the inner side of the retort in which it is located, as is manifest from an inspection of Figures 17 and 18. From one point of view the angular tubular member or pipe 39 of this retort of either Figures 4 to 7 or of Figures 16 to 19 may be considered as a unitary structure and from another point of view it may be considered as a built-up structure. It receives support and is positioned in the retort in any suitable manner, as by means of the members designated as 47 in Figures 4 and 5 or by means of the members designated as 248 in Figures 16 and 17. It will be noted that in the retort of Figures 4 to 7 the angular tubular member 39 is supported on the lowermost interior portion of the retort and any "growing" in a vertical direction of the bulbous portion of the retort will consequently result in a displacement of the horizontal portion of the member 39 in the horizontal exit conduit 26 of the retort. In the retort of Figures 16 to 19 the angular tubular member 39 is supported in the uppermost interior portions of the retort, being supported and positioned by the members 248 that are within the throat portion 27 and end adjacent thereto of conduit 26, and any growing in a vertical direction of the bulbous portion of the retort will not affect the positioning of the angular tubular member within the exit conduit 26. Both forms of retort, however, are commercial and practical.

In the manufacturing of the retorts shown holes are first drilled in the sides, the pins are then inserted and are welded in place, each to its corresponding head. To facilitate the manufacture of the retorts they are made in two parts, each part comprising a portion of the longitudinally extending tubular member 26, a portion of the throat member 27, and a portion of the body member 28 and these parts are welded together after the angular tubular member 39 has been inserted in place, as along the weld 48. The retorts are made of any suitable material for withstanding high heat, for example materials such as nichrome, silica, carborundum, Monel metal, cast iron, cast steel, or forged steel. The lower bulbous portion of the retort of Figures 16 and 17 has been made somewhat thicker than the rest of the retort shell. This is manifest from an inspection of Figures 16 and 17. It is thus constructed because of a tendency toward a wasting away or burning in the lower interior zone of the retort and this tendency is enhanced by careless operation. The zone just referred to is where the heat of the partial combustion or combination is most intense and is opposite or near the lower or delivery end of the angular tubular member 39. It will be remarked, however, that while the thickening of this portion of the retort has advantages from some points of view—in that it adds to the length of life of the retort—it is not necessary, for with proper operation a retort having the shell construction of Figures 4 and 5 has proven commercial and satisfactory.

*Header piping.* (*Heat interchanging device of the apparatus of Figures 1–12.*)

The header piping—heat interchanging device—shown in Figures 10 and 11 comprises a horizontally extending tubular or pipe portion 49 with heads or caps 50 and 51 at the ends thereof and bolted to the flanges 52 of the portion 49. These heads or caps, or in some instances parts thereof, can be taken off to facilitate the removal of any deposits which may collect in the header piping, and to further facilitate the removal of any deposits a groove or trough 53 is provided at the lower interior portion of said header piping. Flanged branch members 54 are provided and serve as the intakes leading to the interior of the header piping. One of these heads or caps 50 has a portion 55 which provides an opening 56 through which the gases may pass, as on their way to a gas holder, and the piping leading to the gas holder may be connected as to the portion 55. The other head or cap 51 has a portion 57 which provides an opening 58 from which gas may flow as through suitable piping as to the pilot burner; this same cap may also have a portion 59 providing an opening 60 which is normally closed, but by means of which when open access may be had to the interior of the header piping 49, as for the purpose of cleaning the same. The header piping has outwardly extending members 61 provided with flanges 62 serving to support a casing 63. This header piping may be used as a part of a heat-interchanging device for heating air, as is the case in the construction of Figures 1 to 3 inclusive, prior to the introducing of combustible into and mixing of combustible with the air. The construction of the heat-interchanging device shown in Figures 1 to 3, and further illustrated in Figures 10, 11, and 12, is such that a coil of pipe 64 occupies the space on the exterior of the horizontally extending portion 49 between the outwardly extending portion 61 and within the casing 63 and from this coil of pipe 64 the air passes on its way to the mixing device and receives heat from the outgoing gaseous products passing through the header piping. Heat insulating material may be provided as at 63ª.

*Piping system (of the apparatus of Figures 1–12).*

The piping system as a whole is diagrammatically shown in Figure 12 and this figure, taken in conjunction with Figures 1, 2 and 3, clearly shows the manner in which the several parts of the apparatus are connected and brought into operative relationship. In Figure 12 it will be noted that the combustible or combustibles—as oil or liquid hydrocarbons—to be gasified are contained in a tank 65 normally closed. Air which is the combustion-supporting gas that is preferably employed in the apparatus is supplied by means of air pump 66. The air and the oil ultimately reach and are delivered to mixing devices 67, 67, from each of which mixing devices the mixed air and oil pass through a pipe 68 which provides a conduit leading to the interior of the retort corresponding to the mixing device. Connections are also made whereby the air and the oil are supplied to a mixing device 69 of the burner 11 which is constituting a part of the burner 11 which is relied upon to effect an initial heating of the retorts and of the structure about the same. The piping system between the closed tank 65 and the air pump 66 on the one hand, and the mixing devices 67, 67, including the mixing device 69 of burner 11 on the other hand is a relatively closed system whereby the air and the oil are delivered to the mixing devices in the proper manner. Each mixing chamber—67 or 69 as the case may be—comprises a reservoir 71 for holding the oil or liquid hydrocarbons conveyed to the mixing devices and a mixing chamber 72 into which the oil and air are delivered and mixed. The reservoir is in communication with the mixing chamber by means of a member 73 which provides a conduit or passageway 70 leading from slightly below the top surface of the oil within the reservoir upwardly and to the mixing chamber. The oil in transit through this conduit or passageway 70 flows past a valve 74 that regulates the size of the passageway through a restricted orifice 75.

As will hereinafter appear, the combustible—oil—is supplied to each reservoir 71 in an amount in excess to that required for gas generating purposes and in order that the height of the oil within the reservoir will be maintained constant—so that it may not exceed a certain amount—an overflow 76 is provided. Oil flows to the reservoir through an inlet opening 77, said reservoir having an air inlet at 78. Oil is supplied to each of the reservoirs of the mixing devices 67, 67, from the tank 65 by means of piping 79 which includes a pump 80, which piping has branches 81, 81. Each said reservoir branch 81 is provided with a valve 82 and enters the oil inlet opening 77. The oil piping 79 also has a branch 83 with valve 84 therein leading to the reservoir of the mixing device 69 of the burner 11. The overflow 76 is in communication, by means of piping 85, 85 each pipe having a valve 86, with the interior of the tank 65. Likewise there is a pipe 87 leading from the overflow of burner 11. Pipe 87 has a valve 88 and is in communication with the tank 65. The air from the air pump passes through a main air pipe 89 which may be considered as including the pipe or conduit 64 that encircles the header piping 49. The pipe 89 and its connections leading to the mixing chambers 72 may be broadly considered as constituting a part of a heat-interchanging device located ahead of the mixing chambers 72 of the mixing devices 67. A valve 90, however, is provided in the main air pipe 89 ahead of the heat-interchanging device just referred to so as to shut off the supply of air to the heat-interchanging device and to the mixing devices 67. From the pipe or conduit 64 of the main air pipe 89 there extend branches 91, 91, each having a valve 92 leading to the mixing chamber 72 of the mixing device corresponding to the branch. From said main air pipe 89 but ahead of the valve 90 there branches a pipe 93 having a valve 94 leading to the mixing chamber of the mixing devices 69 of the burner 11.

In a system of the type in question it is impossible to always maintain constant and without variations or fluctuations the pressure of the air flowing from the pump, but it is important to always maintain constant the ratio between the air and the oil supplied thereto. Therefore, in order that the effect of these variations or fluctuations will be rendered a minimum, the system has been made so that when air is supplied, as through the branch pipes 91 to the mixing chambers 72 and at variant pressure, a corresponding variant air pressure will be exerted on the surface of the oil within the closed tank 65 and on the surface of the oil within the reservoir 71 of the mixing devices.

In the form of apparatus illustrated in Figure 12 this is enabled to be realized by branch pipe 95 leading from the main air pipe 89 to the tank 65, and by pipe 96 having branches as 97 leading from main air pipe 89, each branch 97 having a valve 98 leading to the air inlet 78 of the reservoir corresponding thereto. There is also a branch pipe 99 leading to the air inlet 78 of the reservoir of the mixing device 69. It will be noted that the branch pipes 95, 96 and 99 just referred to tap so to speak the main air pipe 89 at a point ahead of the valve 90—ahead of the heat-interchanging device—whereby only cold air is transmitted to the oil tank 65 or to the oil in the reservoir of the mixing devices. The construction of the piping system, however, is such that while only cold air engages the oil in the tank and reservoirs of the mixing devices, it is so made that the oil from the mixing device is injected into heated air flowing from the heat-interchanging device on the way to the retorts.

The pipe or conduit 68 for each retort leading from the mixing chamber to the interior of the retorts includes as a part thereof the angular tubular member or pipe 39 located within the retort shown, for example, in Figure 4. Said pipe or conduit 68 has a connection, as 100, see Figure 1 also Figure 12, that is easily broken. The space between the angular tubular member or pipe 39 and the longitudinally extending portion 26 of the retort is spanned as by a special pipe fitting member, 101, that normally prevents an escape of gas from the interior of the retort between the retort on the one hand and the longitudinally extending pipe 68 on the other, except through an opening 102 provided for the outflow through said fitting member. This fitting member 101, however, may be provided with a cap 103 normally held in place by a yoke 104 and a screw 105. This cap 103 can be removed whereby access through an opening in the upper portion of the special fitting is obtained in order to dislodge any deposits which may have collected and also permitting of an inspection of the interior of the piping at this point. From this special fitting 101 the gas from the interior of the retort passes through a valve 106 and pipe member 107 that are connected to the flange members 54 of the header piping. The pipe members, as 107, can be provided with suitable removable covers as 108 whereby access to the interior of the piping for cleaning purposes may be readily had.

From the interior of the header piping the gas passes as through a pipe 109 to any suitable place, as to a gas washing or cleaning apparatus on its way to the holder or other place of use.

Mention has heretofore been made to the fact that in some instances it is desirable to make the gas richer than would be possible to make it if external heat were not applied and for the purpose of supplying this external heat a pilot burner 20 is provided which taps off gas, as from the header piping, by means of pipe 111 normally controlled by valve 112; heated air may be tapped off from the main air pipe as by means of branch pipe 113 normally controlled by valve 114. Normally, however, and in most instances this pilot burner is not used when the apparatus is functioning to produce a fixed gas of predetermined calorific value.

*Method of operation (the apparatus of Figures 1 to 12 inclusive).*

In the starting up of the apparatus the oil and air are cut off so that none is introduced into the mixing chambers of the mixing devices 67. The air and the oil pumps are started and the burner 11 is lighted but after the cover or closure plate 12 has been removed from place. The pilot burner 20 may also be lighted—employing for this purpose the gas in the system. The burner 11, and the pilot burner 20 if the latter is used, are allowed to continue to function until the proper heat conditions of the retort and masonry structure about the same have been obtained, the products of combustion during this period being allowed to pass to the stack through the damper-controlled pipe 19. This heat is relied upon to bring the retorts up to a temperature of approximately 1400 degrees F to 1600 degrees F.—between 1350 and 1750 degrees F.—dependent upon the quality of the gas desired, and the nature of the combustible supplied. The combustible and combustion-supporting gas are then caused to flow to the mixing chambers of the mixing devices 67 and the mixture then flows through the conduit 68 which includes the angular tubular member or tube 39; the partial combination of the combustible—the oil—and the combustion-supporting gas—the air—takes place within the lower portion of the retort. The products resulting from this partial combination or combustion pass upwardly through the baffle members that are within the retort and a fixed gas leaves the retort, passing through the throat portion 27 and the longitudinally extending tubular portion 26, then through the piping which is controlled by the valve 106, or any other equivalent means, on its way to and through the header piping 49. It will be manifest that the retort construction herein described may be broadly referred to as a converter, or converters, because therein the reaction takes place which converts the oil and pretakes place which converts the oil and preheated air into a substantially fixed gas. The valve 106 may be referred to as the gas valve. The outflowing gas surrounds and passes along the angular tubular portion 39 and this in effect constitutes a heat-interchanging device which may be considered as included in the system. The hot products from the retorts—which have lost, however, some of the heat due to the heat-interchanging device last mentioned—flow through the header piping which is the header piping shown more in detail in Figures 10 and 11. This header piping and the main air pipe 89 which includes the coiled pipe 64 that is in association with the header piping may be broadly considered as a heat-interchanging device referred to in certain of the claims as a second heat interchanging device, located between the air pump on the one hand and the mixing chambers 72 of the mixing devices 67 on the other, and it will be apparent that in a relatively short period after the apparatus starts to function the heat-interchanging device just described comes into play to heat the air that is supplied to the mixing chamber 72 and prior to the introduction of the combustible—oil —into the combustion-supporting gas—air. It will here be remarked that the important feature of this portion of the apparatus involves the supplying of heat from the outgoing gases to the air on its way to the mixing chambers of the mixing devices and prior to the introduction of the oil therein.

*Description of the apparatus (of Figures 13 to 24 inclusive).*

The apparatus of Figures 13 to 24 functions substantially the same as the apparatus shown in Figures 1 to 12 and heretofore described in detail. It has heretofore been pointed out that either form of retort that has been described can be used in the apparatus of either Figures 1 to 12 or Figures 13 to 24.

The apparatus which is shown in the main in Figures 1 to 3 may be referred to as a single unit construction since it in effect embodies two retorts constituting a set but which operates in effect as a single unit.

When it comes to the construction shown in the main in Figures 13 to 15, it will be observed that there is a plurality or group of these sets or unit constructions all operatively connected in a single installation but in such a manner that any one or more of the sets of units can be shut down or started up without affecting or being affected by the other set or sets of units in the group or battery, as such group may be termed. Figures 14 and 15 may be considered as plan and front elevations of a group or battery of units embodied in a single gas making installation. There are eight retorts in all, two in each set and the battery may be considered as comprising four sets. or four units. While Figure 15 has been briefly described as being a plan view, it will be noted that a portion thereof has been broken away to show the method of mounting the retorts. Each retort is carried in practically the same manner as the retorts of Figures 1 to 3 are carried, that is by hangers as 30 and substantially the same as those shown in Figures 8 and 9, with the exception that each hanger of Figure 15 has forked ears or extensions 201 that provide a space 202 serving to receive a bolt 203 which clamps the hanger in place. This bolt clamps the hanger to an angle iron or cross-beam 204 embedded in the masonry structure of the unit. The cover of each unit is readily removable to permit of access to the two retorts in the unit and either or both of the retorts of any particular unit can be removed or replaced without disturbing any of the other units or their operation.

In Figures 13 to 15 and also in Figure 24 the hydraulic main is designated as 205. This hydraulic main extends the full length of the battery or group of units, as is manifest from an inspection of Figures 14 and 15; each retort is separately connected by piping to this hydraulic main, as is hereinafter described. The hydraulic main constitutes in fact a common header to which the piping leading from each of the retorts is connected. The longitudinally extending tubular portion 26 of each retort, which has been herein described as a horizontally extending exit pipe or conduit leading from the interior of the retort, is connected to a special fitting 206 which has a flanged connection 207 to the upper end of the down-take pipe 208 of the preheater 209 shown in Figures 13, 20 and 21 and indicated also in Figure 24. The lower end of the pipe 208 has a flange connection at 210, see Figure 13, to a piece of piping 211 which is connected to an upper plate 212 of the hydraulic main 205. A depending pipe 213 is also connected with plate 212. The pipes 211 and 213 may together be considered as a depending extension of pipe 208 and as an extension leading from the preheater on the one hand to and into the hydraulic main on the other.

It will be observed that the preheater 209 is located between the hydraulic main on the one hand and the retort on the other and it may also be considered as being located ahead of the mixing device 67 for the corresponding retort.

*Preheater, or heat interchanging device (of apparatus of Figures 13 to 24).*

The preheater of the apparatus of Figures 13 to 24 is shown in detail in Figures 20 to 23 inclusive. It includes the down-take pipe 208 previously referred to through which the hot fixed gases pass on their way from the retort to which the preheater corresponds to the hydraulic main or common header. The down-take pipe 208 is provided by a piece of commercial piping with a flange at each end thereof. Upper and lower head members as 214 are provided and to these heads there is secured a casing 215 which may be referred to as an inner casing. This inner casing 215 is spaced from the exterior of the down-take pipe 208. Within the space thus provided there is located a series of baffle members shown in perspective in Figure 23. Each of these baffle members comprises a ring portion 216 which fits the exterior of the down-take pipe 208 and it has lugs 217 which are relied upon to maintain the desired distance between the flange portions 218 of adjacent baffle members when the baffle members are assembled in place. Each flange portion 218 of the baffle is circular, and fits the interior of the inner casing 215, with the exception that one portion of the flange is cut off as at 219 to leave an opening that provides a passageway for the flow therethrough of combustion-supporting gas. The portions 219 thus cut off are alternately arranged as shown in Figures 20 and 22 with the result that the combustion-supporting gas—air—that enters the lower end of the preheater 205, as through opening 220, takes a sinuous and circuitous path in an upward direction through the preheater ultimately leaving through opening 221. Upper and lower head members as 222 are provided and to these there are secured jacket or outer casing member 223 which provides a space for heat insulating material 224 about the heat interchanging device.

It will be manifest from an inspection of the drawings and from what has preceded that the heat interchanging device thus constructed will efficiently effect a transfer of heat from the hot fixed gases on their way from the retort to the incoming air prior to its entering the mixing chamber of the mixing device 67 by which the combustible —oil—and the heated combustion-supporting gas—air—are mixed prior to the introduction of the resulting mixture into the retort.

*Hydraulic main or common header.*

The hydraulic main or common header is a relatively closed structure having a body member 225 extending horizontally and longitudinally, being substantially U-shape in cross-section. The hydraulic main has an upper cover or plate 212 and vertically and transversely extending end-plates 226. It also has a partition 227 depending from the cover and extending longitudinally from end plate to end plate. The partition dips into the liquid that is contained in the hydraulic main 205; in fact it divides the hydraulic main into two communicating compartments A and B. The lower end of the pipe 213—of the piping leading from the retort—extends into the liquid in compartment B and the liquid thus provides a seal against the back flow of gas, should the piping of any particular retort be disconnected. In this respect the liquid seal is the equivalent of the gas valve 106 of Figure 12. When the apparatus is functioning the liquid in the communicating compartments of the hydraulic main which are on opposite sides of the partition 227 assumes different heights, as indicated, and in order to provide a control for the height of the liquid within compartment A an adjustable water overflow 228, is installed within a small compartment provided by casing member 229 and which small compartment is in communication with compartment A. The liquid passing over this overflow can flow from this casing member 229, as by pipe 230.

An inspection of Figure 15 shows how the piping of each of the retorts is connected to the plate or cover 212 of the hydraulic main. In order that there may be a certain flexibility in the installing of the apparatus and the connecting of the hydraulic main to the retorts adjustable standards 231 have been provided as supports below the hydraulic main. These adjustable standards may also be used for adjustment purposes after installation of the different parts of the apparatus. The gas delivered to the hydraulic main ultimately leaves the same through pipe 232 by which the gas is conducted to the usual scrubber or gas cleaning apparatus, on its way to the holder or to any other place desired.

*Piping (of the system of Figures 13 to 15 and 24).*

It has been previously indicated that the piping scheme for the apparatus or installation of Figures 13 to 24 as a whole is substantially the same as that of the apparatus delineated in Figure 12. In other words, in the apparatus or system of Figures 13—24 there are included and employed practically the same parts as are diagrammatically indicated in Figure 12 such parts for example as the air pump or blower 66, closed oil tank 65, oil pump 80 and the parts in each gas generating units, to wit, such parts as the retorts 6, mixing devices 67, each of which is operatively connected to its corresponding retort, an initial burner 11 having a mixing device 69, a pilot burner 20, and a common header to which the several retorts are connected.

In the apparatus of Figure 12 the retorts of a single unit only are connected to the common header and the common header is a part of the heat interchanging means whereby the combustion-supporting gas is heated prior to its entrance into the mixing chambers of the mixing devices 67 from which the resulting mixture passes to the interior of the retorts, while in the apparatus of Figures 13 to 15 there is a heat interchanging device as 209 between the common header—hydraulic main—on the one hand and each retort and its connected mixing device 67 on the other. Other than this the apparatus of Figures 13 to 15 practically involves merely a multiplying of the gas generating units of the apparatus of Figure 12 and the expanding of the piping system of Figure 12 to take care of this multiplication of units in order to employ a battery of units.

From what has preceded it will be manifest that in the apparatus or system of Figures 13 to 15 as well as in the apparatus or system of Figures 1 to 3 and 12 an air pump as 66, an oil tank as 65, an oil pump as 80, the several mixing devices as 67 and corresponding retorts, the mixing devices 69 of the initial burners 11, the pilot burners as 20, and the heat interchanging devices as 209 are all connected in what is termed a relatively closed system and according to the principle of Figure 12. In both the apparatus of Figures 1 to 3 and of Figures 13 to 15 the heat interchanging devices are arranged to heat the air or combustion-supporting gas prior to its entering the mixing device and prior to the introduction of the combustible into the heated air, preparatory to the formation of a mixture which is ultimately delivered to the retort corresponding to the mixing device.

From Figure 12 and Figure 24 it will also be observed that the outgoing gases and incoming air flow in counter direction to each other whereby from the hottest gases heat is transferred to the incoming mixture at a time when the gases and mixture are flowing in opposite directions and whereby the gases after having lost some of their heat give off more heat to the incoming air flowing on its way to the mixing chambers of the mixing devices at a time when the air and gas flow in counter directions.

In the apparatus of Figures 13, 14 and 15, a pipe 233 corresponds to the main air pipe 89 of Figure 12. Pipe 233 may therefore be referred to as a main air pipe and from it there branches pipes 234 and 235 leading to the preheaters 209. The pipes 235 each enter the openings 220 at the lower end of the preheater corresponding thereto. A valve 236 is located in each of the pipes 235 whereby the supply of air to the preheater may be shut off as desired. From the upper end of each preheater air passes through openings 222 into and through pipe 237 leading to the mixing chamber of the corresponding mixing device 67. In connection with Figure 12 there is described a pipe 96 leading from the main air pipe and having branches 97 leading to the air space above the oil reservoirs in the mixing devices 67. These pipes may be referred to as pressure equalizing pipes, since in conjunction with pipe 95 of Figure 12 the pressure in the oil tank 65 and in the chamber above the oil reservoir is equalized whereby the oil pump 80 always works only against the difference in static head between the oil tank and reservoirs. The equalizing pipe 96 and branches 97 find their equivalent in the apparatus of Figures 13 to 15, in the pipe 238 and its branches as 239 leading to an air space in the oil reservoir of the mixing devices 67. Suitable air pipe connections are made to supply air to the mixing chamber of the mixing devices 69 of the initial burners 11 and equalizing air pipes extend to the air space above the oil reservoir of the same burners. Suitable air connections are made in the system to air supply pipe 240, see Figure 13, from which there extend branches that include piping as 241 leading to the pilot burners of the units. Each pilot burner has a suitable gas connection, as 242, that is connected to the gas piping 242* of the system whereby the fuel gas or in fact any other gas can be employed for use by the pilot burner.

Suitable oil piping is provided as a part of the closed system whereby oil is delivered from the tank by means of a suitable oil pump to each of the mixing devices above mentioned, to wit, mixing devices 67 and 69. The oil piping whereby this is enabled to be realized includes an oil feed-pipe 249, see Figures 13 and 14, which corresponds to pipe 79 of Figure 12. From pipe 249 there extend branch pipes, as 250, leading to the oil reservoirs of the mixing devices 67. A similar connection is made whereby oil is supplied as a part of the closed system to the several reservoirs of the initial burners 11. Oil over-flow pipes lead from each of the oil reservoirs back to closed pipes which ultimately return the excess oil to the supply tank. The oil over flow pipes leading from the oil reservoirs to mixing devices 67 are designated as 251 (the branches) and 252 (a main pipe).

From what has preceded, it will be manifest that the apparatus embodied in battery formation operates substantially the same as the apparatus diagrammatically illustrated in Figure 12. Each of the parts, however, of each unit in the battery is constructed so that any important part can be removed as desired by closing suitably arranged valves and breaking connections; this without disturbing any other member of the system as a whole. For example, any of the retorts can be replaced without disturbing the operation of the other units, also any of the mixing devices or any of the preheaters can be removed without disturbing the continuity of operation of anything other than the unit of which the removed member constitutes a part.

In either form of apparatus herein described one is capable of producing in an efficient and commercial manner large volumes of fixed gas of predetermined calorific value and of chemical constituency and of constant composition. To increase the volume or amount of gas from any given number of retorts all that is necessary is to change the adjustment of an adjustable pressure relief valve PR, see Figure 12, which is on the main air pipe line, to control the pressure of air therein. By this there is under control the volume of air that is delivered to the mixing devices to provide the combustion-supporting gas required in the process.

In apparatus herein described with the retorts once brought to the required gas producing temperature one is enabled to make the desired gas with a heat value of anywhere between 200 and 600 B. t. u. per cubic foot without or independent of the application of external heat to the retort; in other words, the retorts, properly heat insulated by the masonry structure, will be maintained sufficiently heated by heat evolved in the process of incomplete combustion or given off as the result of the reactions that take place during the making of the desired gas.

By the application of external heat during the gas making process, and such external heat that can be supplied as by the pilot burners, one can produce a fixed gas having a higher B. t. u. value, as above 600 B. t. u. value, than would be possible to produce if such external heating were not employed.

*Removal of retorts.*

Retorts employed for this purpose are frequently made of cast steel. With continued use they ultimately require replacement. The apparatus, therefore, has been designed to permit a ready removal of any one retort and replacement by another without necessarily disturbing the other retorts. A connection, as 115, between each retort on the one hand and its corresponding gas valve 106 on the other is made so that the connection can be readily broken and established, and this is true also of the connection 100 in the pipe or conduit 68 leading from the mixing chamber to the interior of the retort. When it is desired to remove any particular retort the valves in the several pipes leading to and from the mixing devices corresponding to the retort are closed, to wit, the valves 98 and 92 in the branches of the air piping and the valves 82 and 86 of the oil piping corresponding to the mixing devices that correspond to the particular retort, the gas valve 106 or equivalent sealing means corresponding to the particular retort also being closed. Thereafter the connections as 100 and 115 of the apparatus of Figures 1–3 and 12 or as 100 and 207 of the apparatus of Figures 13–15 are broken, the roof member 7 is taken out, the particular retort is removed, and with it its hook-shaped support if the removal of the latter is advantageous in the judgment of the operator, and another retort with the hook-shaped members for supporting it in place are inserted, the roof or cover is replaced and the connections are again made or established. Thereafter, the process of making gas may be resumed when that particular retort has become sufficiently heated. This can all be accomplished, if desired, without stopping the operation of the other retorts in another set in the battery of retorts.

The improvements herein set forth are not limited to the precise construction and arrangement shown and described for they may be embodied in various forms, and modifications without departing from the spirit and scope of the invention.

I claim as my invention:

1. The making from a liquid combustible of a fixed gas having a calorific value of 200 B. t. u. and upwardly and which fixed gas is of substantially constant composition and calorific value by the process which consists in preliminarily heating a continuous inflow of combustion-supporting gas, continuously, intimately and uniformly mixing the liquid combustible with the inflowing preliminarily heated combustion supporting gas while maintaining a predetermined or established ratio of the liquid combustible and combustion-supporting gas combined, heating said mixture and causing said heated mixture to flow inwardly to enter a gasifying chamber which is maintained at a predetermined temperature of between 1350 and 1750 degrees F. dependent upon the nature of the combustible used and upon the composition and calorific value of the fixed gas desired, causing or allowing a partial combustion of the liquid combustible to take place in said gasifying chamber, said combustion being only partial because the combustion-supporting gas is insufficient in amount to permit or to effect a complete combustion, and causing heat to pass from the hot resulting fixed gas thus produced first to that inwardly flowing mixture in order to add heat thereto prior to its entering the gasifying chamber and thereafter to the inflowing combustion-supporting gas in order to effect the preliminary heating prior to the mixing of the liquid combustible with the inflowing combustion-supporting gas.

2. The making from a liquid combustible of a fixed gas having a calorific value of 200 B. t. u. and upwardly and which fixed gas is of substantially constant composition and calorific value by the process which consists in preliminarily heating a continuous inflow of combustion-supporting gas, continuously, intimately and uniformly mixing the liquid combustible with the inflowing preliminarily heated combustion-supporting gas while maintaining a predetermined or established ratio of the liquid combustible and combustion-supporting gas combined, heating said mixture and causing said heated mixture to flow inwardly to enter a gasifying chamber which is maintained, without the application of external heat after the gas making operation is under way, at a predetermined temperature of between 1350 and 1750 degrees F., dependent upon the nature of the combustible used and upon the composition and calorific value of the fixed gas desired, causing or allowing a partial combustion of the liquid combustible to take place in said gasifying chamber, said combustion being only partial because the combustion-supporting gas is insufficient in amount to permit or to effect a complete combustion, and causing heat to pass from the hot resulting fixed gas thus produced first to the inwardly flowing mixture in order to add heat thereto prior to its entering the gasifying chamber and thereafter to the inflowing combustion-supporting gas in order to effect the preliminary heating prior to the mixing of the liquid combustible with the inflowing combustion-supporting gas.

3. The process of making gas of substantially constant composition and calorific value from a liquid combustible which consists in heating a combustion-supporting gas and introducing it under pressure and while hot to a mixing device, independently delivering a combustible at a substantially constant level so close to an inlet of said mixing device as to substantially eliminate the effects of friction and inertia of the liquid upon its delivery through said inlet into the mixing device, introducing said combustible into the mixing device in a predetermined ratio to the quantity of combustion-supporting gas and at a pressure varying with the pressure of the combustion-supporting gas in order to maintain said ratio constant, varying the pressure of the combustion-supporting gas when the amount of gas to be made is to be varied, conducting the resulting mixture to a heated zone to produce chemical reaction while adding heat to the mixture on its way to the heated zone, and recovering for use the products of said reactions, the method being carried out in such a manner that the heat for heating the combustion-supporting gas and the heat added to the mixture on its way to the heated zone where the chemical reactions are produced is derived in each instance from the hot products of said reactions.

4. The process of making gas of substantially uniform composition and calorific value, which consists in introducing hot air under pressure to a mixing device, delivering a combustible into the mixing device in such ratio to the quantity of air that the quantity of air is insufficient to completely burn the combustible and in a manner whereby the ratio of the air and the combustible is maintained substantially constant, conducting the resulting mixture to a heated zone, permitting chemical reaction, and conducting away the hot products of said reaction in a manner to heat the air which is flowing under pressure to the mixing device but after the hot products of said reaction have given off some heat to the mixture on its way to said heated zone.

5. The process of making gas of substantially uniform calorific value from a liquid combustible, which consists in introducing said combustible into a mixing device and also in introducing air under pressure to the mixing device, which air is insufficient in amount to completely burn the combusible, varying the air pressure when the amount of gas is to be varied but maintaining substantially constant a predetermined ratio between the air and the combustible, conducting the mixture from the mixing device into a zone heated sufficiently through the heat evolved in the process of incomplete combustion to produce and maintain combustion, although incompletely, and conducting away the hot products resulting from said incomplete combustion through heat interchanging means constructed so as to give off heat to the mixture from the mixing device and also to the air prior to the mixing of the combustible with the air.

6. The making from a suitable combustible of gas having a heating value of between 200 to 600 B. t. u. and of substantially constant composition and calorific value by the process which consists in introducing said combustible into a mixing device and also in introducing air under pressure into the mixing device, which air is insufficient in amount to completely burn the combustible, varying the air pressure when the amount of gas is to be varied but maintaining substantially constant a predetermined ratio between the air and the combustible, conducting the mixture from the mixing device into a zone maintained sufficiently heated through heat evolved in the process of incomplete combustion, independently of external heating, particularly after the gas making process is under way, to produce and maintain the desired incomplete combustion, and conducting away the hot products resulting from said incomplete combustion through heat interchanging means constructed so as to give off heat to the mixture from the mixing device and also to the air prior to the mixing of the combustible with the air.

7. The process which consists in delivering air under pressure through a heat interchanging device to a mixing device and also independently supplying oil into said mixing device while maintaining substantially constant a predetermined proportion of air and oil, the air being insufficient in amount to completely burn the oil, introducing the mixture from said mixing device to a heated reaction zone whereat partial combustion takes place, withdrawing the resulting gas and passing the same through said heat interchanging device.

8. An apparatus for making a combustible gas comprising a retort, a mixing means, means for supplying under pressure a continuous current of air to said mixing means, means for independently supplying a liquid combustible to said mixing means, means for conducting a continuous current of the mixed air and combustible from the mixing means to said retort, a heat interchanging device through one passageway of which the mixture passes and through another passageway of which the combustible gas that is produced in the retort passes when flowing from the retort and a second heat interchanging device through one passageway of which the air flowing to the mixing device passes and through another passageway of which the combustible gas passes after having passed through the first-mentioned heat interchanging device.

9. An apparatus for making a combustible gas from oil, said apparatus comprising a converter, means for maintaining said converter at a temperature of combustion and this independent of external heat supply, a mixing device, a conduit connecting said device to the converter, a conduit for supplying air under pressure to said mixing device, a conduit for supplying oil to said mixing device, means for causing an interchange of heat from the hot gases leaving the converter to the mixture flowing from the mixing device to the converter, and means for causing an interchange of heat from the gases thus partially cooled to the incoming air and prior to the mixing of the oil with the air.

10. An apparatus for generating gas from a suitable combustible as liquid hydrocarbons, which apparatus includes in combination a gas generator, an air pump, a tank, and a relatively closed piping system between the air pump and the tank on the one hand and the interior of the gas generator on the other, which closed piping system comprises a mixing device having a portion providing an oil reservoir and a portion providing a mixing chamber in communication with each other but only through a conduit providing a restricted orifice and leading upwardly from below the upper surface of the liquid within the reservoir to the interior of the mixing chamber, a main air pipe leading from the air pump and in communication with the mixing chamber, a conduit or pipe leading from the mixing chamber to the interior of the generating chamber of the gas generator, piping having pumping means for supplying liquid hydrocarbon from the tank to the reservoir, an overflow pipe by means of which a head or level of the liquid hydrocarbon pumped into the reservoir is maintained substantially constant, which overflow pipe extends from the reservoir to the tank, and branch pipes leading from said main air pipe to the air space in the upper portion of the reservoir of the mixing device and to the tank, the apparatus being characterized by having heat interchanging means through which the hot generated gases pass on their way from the gas generating chamber, first through a heat interchanging means or device that includes the conduit leading from the mixing chamber of the mixing device to the interior of the gas-generating chamber and thereafter through a heat interchanging means or device that includes a part of the main air pipe leading from the main air pump and in communication with the mixing chamber, said last-mentioned heat interchanging means or device being located between the branch pipes leading from the main air pipe to the reservoir and to the tank on the one hand and the mixing chamber of the mixing device on the other hand.

11. An apparatus for generating gas from a suitable combustible as liquid hydrocarbons, which apparatus includes in combination a plurality of gas-generating retorts arranged as and constituting a set of retorts, a header piping common to the retorts of the set, a pipe or conduit for and leading from the interior of each retort to the header piping, there being in or for each said pipe or conduit suitable means for permitting the establishing or for cutting off communication between the retort corresponding to said means and the header piping and also a readily disassembled and readily assembled connection between said means and its corresponding retort, a tank for holding the combustible, a piping system between the tank on the one hand and the interior of the gas-generating retorts on the other, which piping system comprises for each generating retort a mixing device having a portion providing a reservoir and a portion providing a mixing chamber that are in communication with each other through a restricted orifice or passageway, there being an air inlet for each mixing chamber, a conduit leading from each mixing chamber to the interior of the corresponding retort, which conduit comprises a connection which is readily disassembled and readily assembled and which is located between the mixing chamber and its corresponding retort, piping for conducting the combustible from the tank and branching to the reservoir of each mixing device, there being a valve in each branch of said last-mentioned piping, an overflow pipe for each reservoir whereby only a desired head or level of the combustible within the reservoir can be maintained, and means for causing the air to enter any mixing chamber for causing a mixture of air and combustible to pass from the mixing chamber into its corresponding retort wherein gas is produced, and for causing the gas to leave the retort and pass through said header piping, the construction of the apparatus being such that the pressure of the air on the combustible in the reservoir and the tank is substantially that of the air entering the mixing chambers.

12. An apparatus for generating gas from liquid hydrocarbons which apparatus includes in combination a plurality of gas-generating retorts arranged as and constituting a set of retorts, a header piping common to the retorts of the set, a pipe or conduit for and leading from each retort to the header piping, there being for each said pipe or conduit means for establishing or cutting off communication between the retort corresponding to the means and the header piping and also a readily disassembled and readily assembled connection between the means and its corresponding retort, a tank for holding liquid hydrocarbons, a piping system between the tank on the one hand and the interior of the retorts on the other, which piping system comprises for each retort a mixing device having a portion providing an oil reservoir and a portion providing a mixing chamber that are in communication with each other through a restricted orifice or passageway, there being an air inlet for each mixing chamber, a conduit leading from each mixing chamber to the interior of the corresponding retort, which conduit comprises a connection which is readily disassembled and readily assembled and which is located between the mixing chamber and its corresponding retort, piping for conducting liquid hydrocarbons from the tank and branching to the reservoir of each mixing device, an overflow pipe for each reservoir whereby only a desired head or level of the liquid hydrocarbons within the reservoir can be maintained, and means for causing the air to enter the mixing chambers and for causing the resultant gas to leave the retorts and pass through the header piping, the construction of the apparatus being such that the pressure of the air on the liquid hydrocarbons in the reservoir and the tank is substantially that of the pressure at the source of air entering the mixing chambers, the retorts each being connected in the apparatus so that it can be removed and replaced by another.

13. An apparatus for generating gas from liquid hydrocarbons which apparatus includes in combination a plurality of gas-generating retorts arranged in sets, an air pump, a closed tank for holding liquid hydrocarbons, and a relatively closed piping system between the air pump and the closed tank on the one hand and the interior of the retorts on the other, which closed piping system comprises for each retort a mixing device having a portion providing an oil reservoir and a portion providing a mixing chamber in communication with each other but only through a conduit providing a restricted orifice or passageway, a main air pipe leading from the air pump and branching to each mixing chamber, there being a valve in each said branch, a conduit leading from each mixing chamber to the interior of its corresponding retort, piping having pumping means for conducting liquid hydrocarbons from the closed liquid hydrocarbon tank and branching to the reservoir of each mixing device, there being a valve in each branch of said last-mentioned piping, an overflow for each reservoir whereby a head or level of the liquid hydrocarbons within the reservoir cannot exceed a certain amount, each of which overflow pipes is provided with a valve and is in communication with the tank when its valve is open, branch piping leading from said main air pipe to the air space in the upper portion of the reservoir of each mixing device, there being a branch leading to each reservoir with a valve in each branch, there also being a branch leading from the main air pipe to the tank, the retorts each being connected in the rest of the apparatus in such manner that any retort in any set can be removed and replaced by another without interrupting the operation of making gas in any other set.

14. An apparatus for generating gas from liquid hydrocarbons which apparatus includes in combination a plurality of gas-generating retorts arranged in sets, an air pump, an enclosed tank for holding liquid hydrocarbons, and a relatively closed piping system between the air pump and the closed tank on the one hand and the interior of the retorts on the other, which closed piping system comprises for each retort a mixing device having a portion providing an oil reservoir and a portion providing a mixing chamber in communication with each other, a main air pipe leading from the air pump and branching to each mixing chamber, a conduit or pipe leading from each mixing chamber to the interior of the corresponding retort, piping for conducting liquid hydrocarbons from the closed liquid hydrocarbon tank and branching to the reservoir of each mixing device, an overflow pipe for each reservoir whereby a head or level of the liquid hydrocarbons within the reservoir cannot exceed a certain amount, each overflow pipe being in communication with the tank, branch piping leading from said main air pipe to the interior of the reservoir of each mixing device and also a branch pipe leading from the main air pipe to the tank, said apparatus also having a header piping common to the retorts and piping for and leading from the interior of each retort to said header piping, the closed piping system and the piping leading from each retort to the header piping being provided with sufficient valves or equivalent means and constructed so that a retort of any one set can be removed and can be replaced by another without interrupting the operation of making gas in the retorts of any other set.

15. An apparatus for generating gas from liquid hydrocarbons which apparatus includes in combination gas-generating retorts arranged in a set, a header piping common to the retorts in the set, a pipe or conduit for and leading from each retort to the header piping, there being means in each said pipe or conduit for establishing and for cutting off communication between the retort corresponding thereto and the header piping, there also being a readily broken and readily established connection between each said means and its corresponding retort, an air pump, a tank for holding hydrocarbons, and a piping system between the air pump and the tank on the one hand and the interior of the gas-generating retorts on the other, which piping system comprises for each gas-generating retort a mixing device having a portion providing an oil reservoir and a portion providing a mixing chamber that are in communication with each other through a conduit providing a restricted orifice or passageway, a main air pipe leading from the air pump and branching to each mixing chamber, there being a valve in each said mixing chamber branch, a conduit leading from each mixing chamber to the interior of its corresponding gas-generating retort, each of which last-mentioned conduits has a readily broken and a readily established connection between its corresponding mixing chamber and retort structure, piping having pumping means for conducting liquid hydrocarbons from the tank and branching to the reservoir of each mixing device, there being a valve in each said reservoir branch, an overflow pipe for each reservoir whereby a level or head of liquid hydrocarbon within the reservoir cannot exceed a certain height, which overflow pipe is provided with a valve and is in communication with the tank, piping leading from said main air conduit and branching to the air space in the upper portion of the reservoir of each mixing device, there being a valve in each last-mentioned branch, and a branch pipe leading from the main air conduit to the tank, the gas-generating retorts each being installed in the apparatus so that it can be readily removed from operative position and replaced without interrupting the operation of the making of gas in the retorts of any other set.

16. An apparatus for making gas comprising in combination with the converter, of a mixing device having a reservoir into which the oil is received and from which the oil flows from slightly below the top surface of the oil in the reservoir upwardly and through a restricted orifice to a place where it is mixed in the mixing chamber of the mixing device with heated air flowing under pressure toward the converter, a conduit connecting said mixing chamber and converter and through which conduit the mixture of oil and heated air flows to the interior of the converter, a heat-interchanging device, a conduit connecting the converter and the heat-interchanging device whereby hot gases pass from the interior of the converter through the heat-interchanging device, means comprising a pump and a main air pipe leading from the main air pump to the heat-interchanging device whereby air is supplied under pressure to said heat-interchanging device, said heat-interchanging device having a passageway that receives cold air from the main air pipe and that is in communication with the mixing chamber of the mixing device whereby heated air is delivered into the said mixing chamber, and a branch pipe connecting the main air pipe and the reservoir whereby air which is cool exerts a pressure behind the oil that is always substantially the same as the air pressure within the main air pipe.

17. An apparatus for generating gas from liquid hydrocarbons which apparatus includes in combination a gas generator, an air pump, a closed tank for holding the liquid hydrocarbons, and a piping system which piping system comprises a mixing device having a portion providing an oil reservoir and a portion providing a mixing chamber, said reservoir and said mixing chamber being in communication with each other through a conduit having a restricted passageway and leading from below the upper surface of the liquid within the reservoir to the interior of the mixing chamber, a main air pipe or conduit leading from the air pump to the mixing chamber, a pipe or conduit leading from the mixing chamber to the interior of the gas generator, piping having pumping means for conducting hydrocarbons from the closed liquid hydrocarbon tank to the reservoir of the mixing device, an overflow pipe whereby in conjunction with the pumping means a head or level of liquid hydrocarbons within the reservoir is maintained substantially constant, which overflow pipe leads back to the closed tank, a branch pipe leading from said main air conduit to the air space in the upper portion of the reservoir in the mixing device, and a branch pipe leading to the closed tank, said piping system being provided with a heat-interchanging device, through which hot gases from the gas-generator pass, the apparatus being characterized by having said heat-interchanging device constructed so as to include a portion of the main air conduit which is located between said branch pipes on the one hand and the mixing chamber of the mixing device on the other.

18. An apparatus for generating gas which apparatus comprises in combination a gas generator, an air pump, a closed oil tank, and a relatively closed piping system between the air pump and the oil tank on the one hand and the interior of the gas generator on the other, which closed piping system comprises a mixing device having a portion providing an oil reservoir and a portion providing a mixing chamber that are in communication with each other through a conduit having an adjustable orifice and leading from below the upper surface of the liquid within the reservoir to the interior of the mixing chamber, a main air pipe or conduit leading from the air pump and in communication with the mixing chamber, a pipe or conduit leading from the mixing chamber to the interior of the gas generator, piping for supplying oil from the tank to the reservoir of the mixing device, an overflow pipe whereby a head or level of the oil within the reservoir is maintained substantially constant, said overflow pipe leading to the closed tank, a branch pipe leading from the main air pipe to an air space in the upper portion of the reservoir of the mixing device, and a branch pipe leading from said main air pipe to the closed tank, said closed piping system being characterized by having a heat-interchanging device through which hot gases from the generator pass and which heat-interchanging device includes a portion of the main air pipe that is behind the branch pipe leading to the reservoir and the closed oil tank but is ahead of the place where the main air pipe is in communication with the mixing chamber of the mixing device, the construction thus being such that the cold air from the air pump passes through the branch pipes to exert pressure on the oil within the reservoir of the mixing device and on the oil within the tank and such that heated air passes to the mixing chamber of the mixing device.

This specification signed the 3rd day of August A. D. 1920.

WALTER C. DAYTON.